(12) United States Patent
Frevert et al.

(10) Patent No.: US 11,678,059 B2
(45) Date of Patent: *Jun. 13, 2023

(54) MICROLENSING FOR REAL-TIME SENSING OF STRAY LIGHT

(71) Applicant: Waymo LLC, Mountain View, CA (US)

(72) Inventors: Benjamin Frevert, Mountain View, CA (US); Lucian Ion, Santa Clara, CA (US); Nirav Dharia, Milpitas, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,922

(22) Filed: Apr. 20, 2022

(65) Prior Publication Data

US 2022/0247907 A1    Aug. 4, 2022

Related U.S. Application Data

(63) Continuation of application No. 17/108,049, filed on Dec. 1, 2020, now Pat. No. 11,343,435.

(Continued)

(51) Int. Cl.
*H04N 23/71* (2023.01)
*G05D 1/02* (2020.01)
(Continued)

(52) U.S. Cl.
CPC .......... *H04N 23/71* (2023.01); *G05D 1/0231* (2013.01); *H04N 23/10* (2023.01); *H04N 23/76* (2023.01); *H04N 25/60* (2023.01)

(58) Field of Classification Search
CPC ........ H04N 23/71; H04N 23/10; H04N 23/76; H04N 25/60; H04N 23/60; H04N 25/671; H04N 23/811; G05D 1/0231
See application file for complete search history.

(56) References Cited

U.S. PATENT DOCUMENTS 7,924,419 B2    4/2011   Naftali et al.
8,675,182 B2    3/2014   Bamji
(Continued)

FOREIGN PATENT DOCUMENTS

| CN | 103811509 A | 5/2014 |
| KR | 10-2018-0073189 A | 7/2018 |
| WO | 2019/101337 A1 | 5/2019 |

OTHER PUBLICATIONS

"Improving Optical Measurements: Non-Linearity Compensation of Compact Charge-Coupled Device (CCD) Spectrometers"; Münevver Nehir et al.; Sensors 2019, 19, 2833 (Jun. 25, 2019).

(Continued)

*Primary Examiner* — Michael Lee
(74) *Attorney, Agent, or Firm* — McDonnell Boehnen Hulbert & Berghoff LLP

(57) ABSTRACT

Example embodiments relate to microlensing for real-time sensing of stray light. An example device includes an image sensor that includes a plurality of light-sensitive pixels. The device also includes a first lens positioned over a first subset of light-sensitive pixels selected from the plurality of light-sensitive pixels. Further, the device includes a controller. The controller is configured to determine a first angle of incidence of a first light signal detected by the first subset of light-sensitive pixels. The controller is also configured to, based on the first determined angle of incidence, determine an amount of stray light incident on the image sensor.

20 Claims, 16 Drawing Sheets

Related U.S. Application Data

(60) Provisional application No. 62/953,721, filed on Dec. 26, 2019.

(51) Int. Cl.
  *H04N 23/10* (2023.01)
  *H04N 23/76* (2023.01)
  *H04N 25/60* (2023.01)

(56) References Cited

U.S. PATENT DOCUMENTS

| | | | |
|---|---|---|---|
| 9,202,833 B2 | 12/2015 | Mackey | |
| 9,224,782 B2 | 12/2015 | Keelan | |
| 9,294,756 B2 | 3/2016 | Yamazaki | |
| 10,298,863 B2 | 5/2019 | Silverstein et al. | |
| 10,341,620 B2 | 7/2019 | Murata | |
| 10,375,282 B2 | 8/2019 | Ishida et al. | |
| 11,343,435 B2 * | 5/2022 | Frevert | H04N 25/671 |
| 2009/0141361 A1 | 6/2009 | Yamagata et al. | |
| 2010/0128353 A1 | 5/2010 | Nagata et al. | |
| 2010/0182700 A1 | 7/2010 | Thomas et al. | |
| 2012/0188648 A1 | 7/2012 | Lai et al. | |
| 2014/0313350 A1 | 10/2014 | Keelan | |
| 2015/0015750 A1 | 1/2015 | Stern et al. | |
| 2015/0054103 A1 | 2/2015 | Mackey | |
| 2015/0116527 A1 * | 4/2015 | Rossi | H04N 23/63 348/218.1 |
| 2015/0146014 A1 | 5/2015 | Black et al. | |
| 2015/0381951 A1 | 12/2015 | Mlinar et al. | |
| 2016/0301357 A1 | 10/2016 | Chen | |
| 2017/0070689 A1 * | 3/2017 | Silverstein | H04N 25/671 |
| 2017/0131526 A1 * | 5/2017 | Park | H04N 23/51 |
| 2018/0239222 A1 | 8/2018 | Cahall et al. | |
| 2018/0306721 A1 | 10/2018 | Nakada et al. | |
| 2019/0196183 A1 | 6/2019 | Yokogawa | |
| 2020/0029035 A1 * | 1/2020 | Agranov | H04N 25/704 |
| 2020/0381467 A1 | 12/2020 | Kusaka | |

OTHER PUBLICATIONS

"Shack-Hartmann Wavefront Sensor"; URL: https://en.wikipedia.org/wiki/Shack-Hartmann_wavefront_sensor; captured by web.archive.org (Feb. 3, 2019).

International Search Report and Written Opinion for PCT/US2020/065558, dated Apr. 6, 2021, 8 pages.

\* cited by examiner

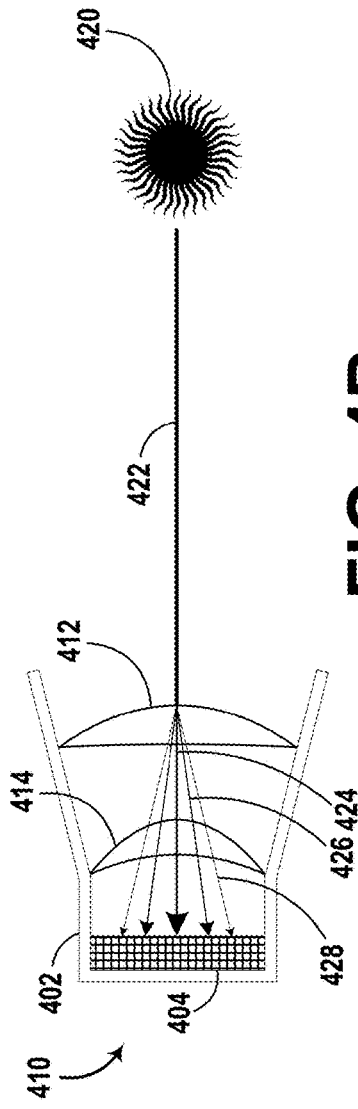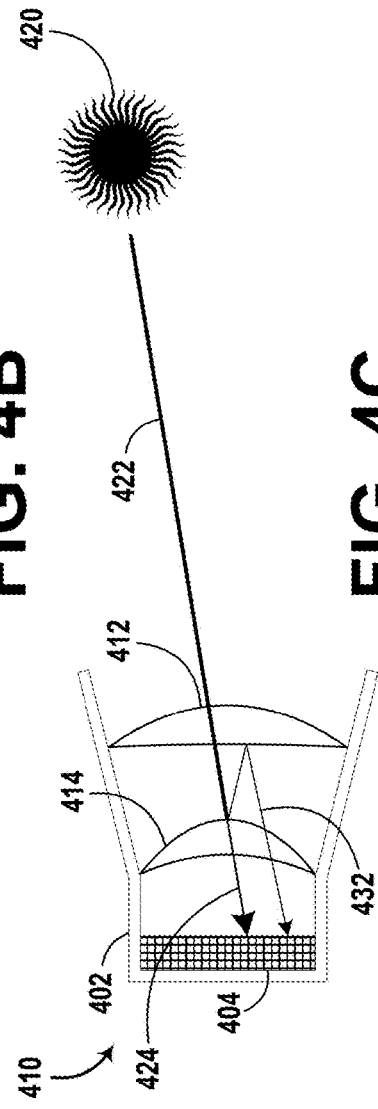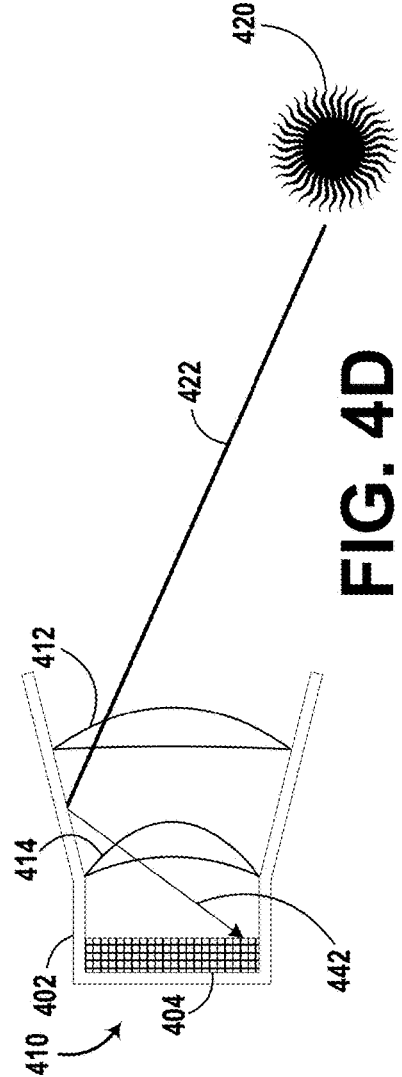

MICROLENSING FOR REAL-TIME SENSING OF STRAY LIGHT

CROSS-REFERENCE TO RELATED APPLICATIONS

The present application claims priority to Non-Provisional patent application Ser. No. 17/108,049, filed with the U.S. Patent and Trademark Office on Dec. 1, 2020 and Provisional Patent Application No. 62/953,721, filed with the U.S. Patent and Trademark Office on Dec. 26, 2019, the contents of each of which are hereby incorporated by reference.

BACKGROUND

Unless otherwise indicated herein, the materials described in this section are not prior art to the claims in this application and are not admitted to be prior art by inclusion in this section.

Cameras and image sensors are devices used to capture images of a scene. Some cameras (e.g., film cameras) chemically capture an image on film. Other cameras (e.g., digital cameras) electrically capture image data (e.g., using a charge-coupled device (CCD) or complementary metal-oxide-semiconductor (CMOS) sensors). Images captured by cameras can be analyzed to determine their contents. For example, a processor may execute a machine-learning algorithm in order to identify objects in a scene based on a library of previously classified objects that includes objects' shapes, colors, sizes, etc. (e.g., such a machine-learning algorithm can be applied in computer vision in robotics or other applications).

Cameras can have a variety of features that can distinguish one camera from another. For example, cameras and/or images captured by cameras may be identified by values such as aperture size, f-number, exposure time, shutter speed, depth of field, focal length, International Organization for Standardization (ISO) sensitivity (or gain), pixel size, sensor resolution, exposure distance, etc. These features may be based on the lens, the image sensor, and/or additional facets of the camera. Further, these features may also be adjustable within a single camera (e.g., the aperture of a lens on a camera can be adjusted between photographs).

Further, as a result of imperfections of optics within a camera, aberrations within captured images can be generated. For example, misalignment, non-unity transmittance, internal reflections, debris, etc. may cause light from a scene to be directed to unintended/improper regions of an image sensor. Such stray light may appear as veiling glare or lens flare within a captured image.

SUMMARY

This disclosure relates to detecting (and, in some embodiments, compensating for) stray light incident on the image sensor of a camera using microlenses. The microlenses may be positioned over a set of light-sensitive pixels on the image sensor. Based on the signal intensity detected by each of the light-sensitive pixels underlying the microlens, an angle of incidence of an incoming light signal may be determined. Based on the determined angle of incidence, the incoming light signal can be identified as stray light (e.g., veiling glare and/or a ghost image) or an actual image signal. In some embodiments, corrections in hardware or software may be employed to compensate for the stray light incident on the image sensor and/or to reduce the amount of stray incident on the image sensor based on the identified stray light.

In one aspect, a device is provided. The device includes an image sensor that includes a plurality of light-sensitive pixels. The device also includes a first lens positioned over a first subset of light-sensitive pixels selected from the plurality of light-sensitive pixels. Further, the device includes a controller. The controller is configured to determine a first angle of incidence of a first light signal detected by the first subset of light-sensitive pixels. The controller is also configured to, based on the first determined angle of incidence, determine an amount of stray light incident on the image sensor.

In another aspect, a method is provided. The method includes receiving, at a lens positioned over a first subset of light-sensitive pixels selected from a plurality of light-sensitive pixels that are part of an image sensor, a first light signal. The method also includes directing, using the lens, the first light signal toward the first subset of light-sensitive pixels. Further, the method includes detecting, by one or more light-sensitive pixels of the first subset, the first light signal. In addition, the method includes determining a first angle of incidence of the detected first light signal. Still further, the method includes determining, based on the first determined angle of incidence, an amount of stray light incident on the image sensor.

In an additional aspect, a device is provided. The device includes an image sensor that includes a plurality of light-sensitive pixels. The device also includes a plurality of subsets of light-sensitive pixels selected from the plurality of light-sensitive pixels positioned along an entire periphery of the image sensor. Further, the device includes a plurality of lenses. Each lens is positioned over a corresponding subset of light-sensitive pixels. In addition, the device includes a controller. The controller is configured to determine the angle of incidence of light detected by each subset of light-sensitive pixels. The controller is also configured to, based on the determined angles of incidence, determine a stray-light map across the image sensor.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 4B is an illustration of a mechanism that gives rise to veiling glare within an optical detector system, according to example embodiments.

FIG. 4C is an illustration of a mechanism that gives rise to veiling glare within an optical detector system, according to example embodiments.

FIG. 4D is an illustration of a mechanism that gives rise to veiling glare within an optical detector system, according to example embodiments.

DETAILED DESCRIPTION

Figure 1:
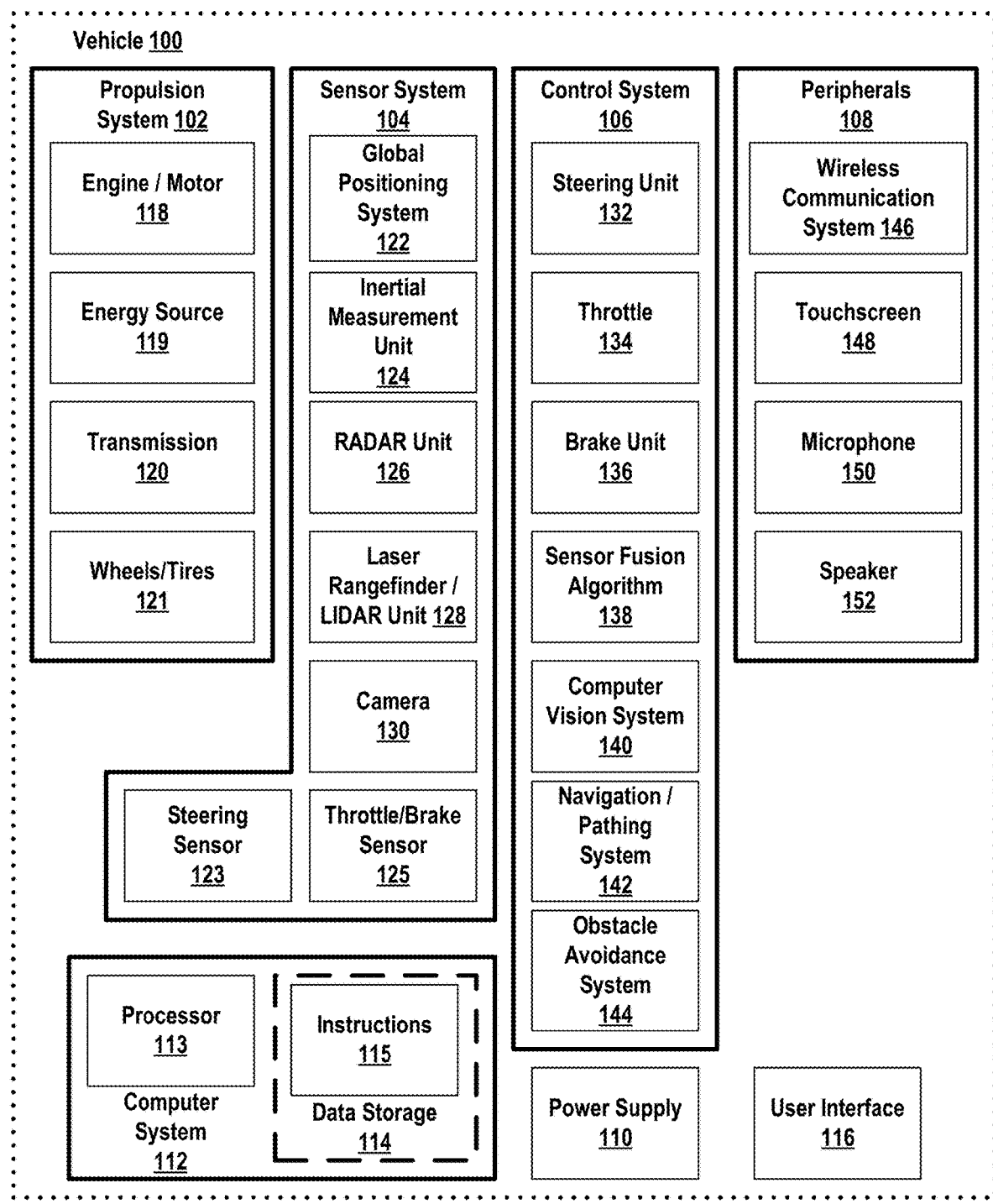
FIG. 1 is a functional block diagram illustrating a vehicle, according to example embodiments.
Figure 2A:
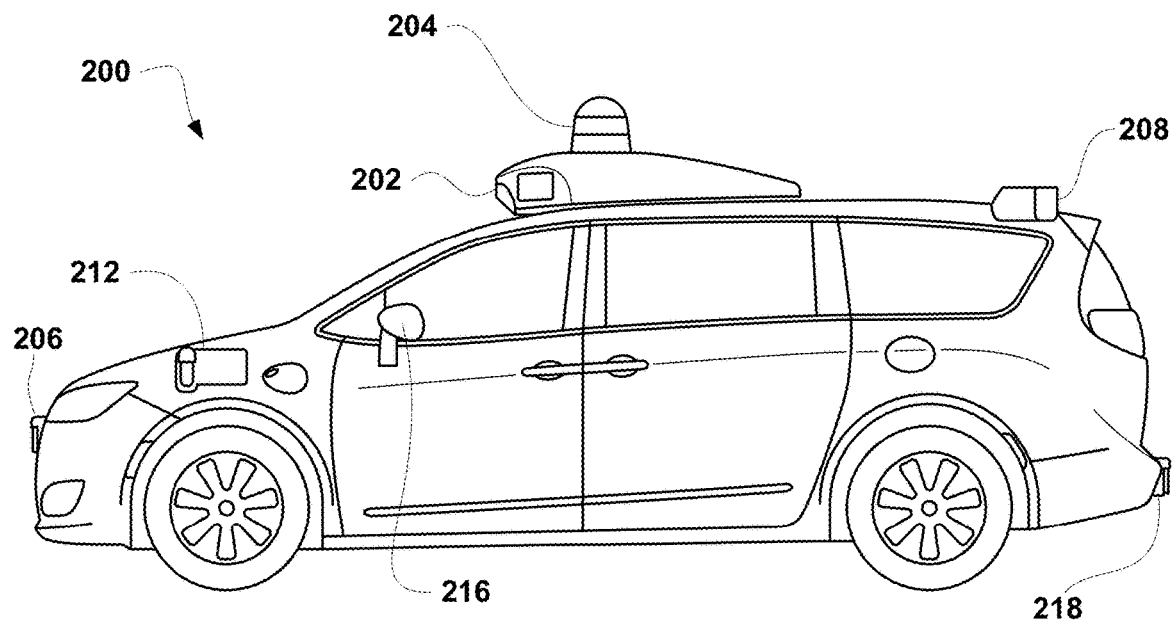
FIG. 2A is an illustration of a physical configuration of a vehicle, according to example embodiments.
Figure 2B:
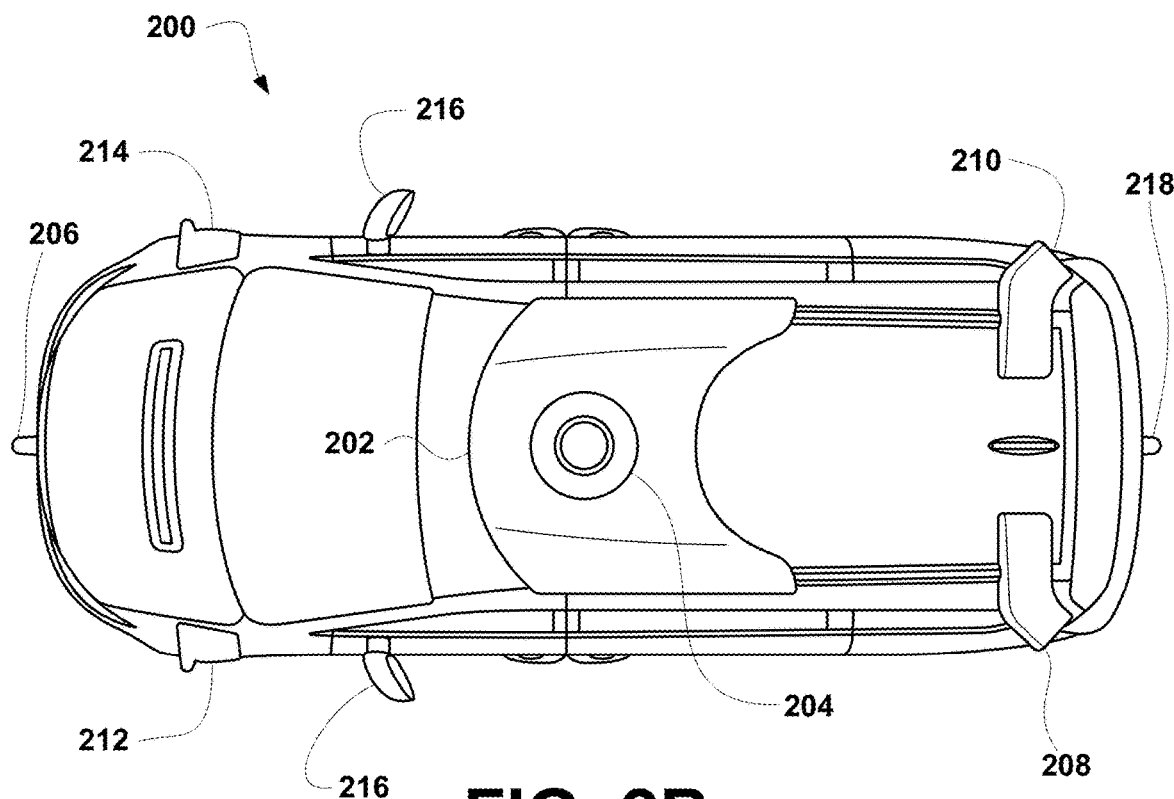
FIG. 2B is an illustration of a physical configuration of a vehicle, according to example embodiments.
Figure 2C:
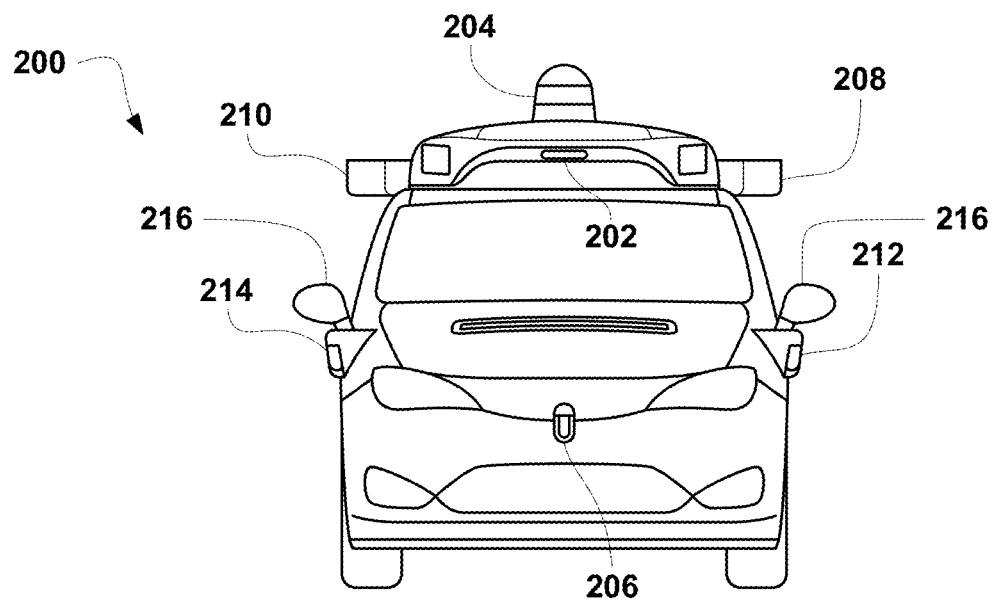
FIG. 2C is an illustration of a physical configuration of a vehicle, according to example embodiments.
Figure 2D:
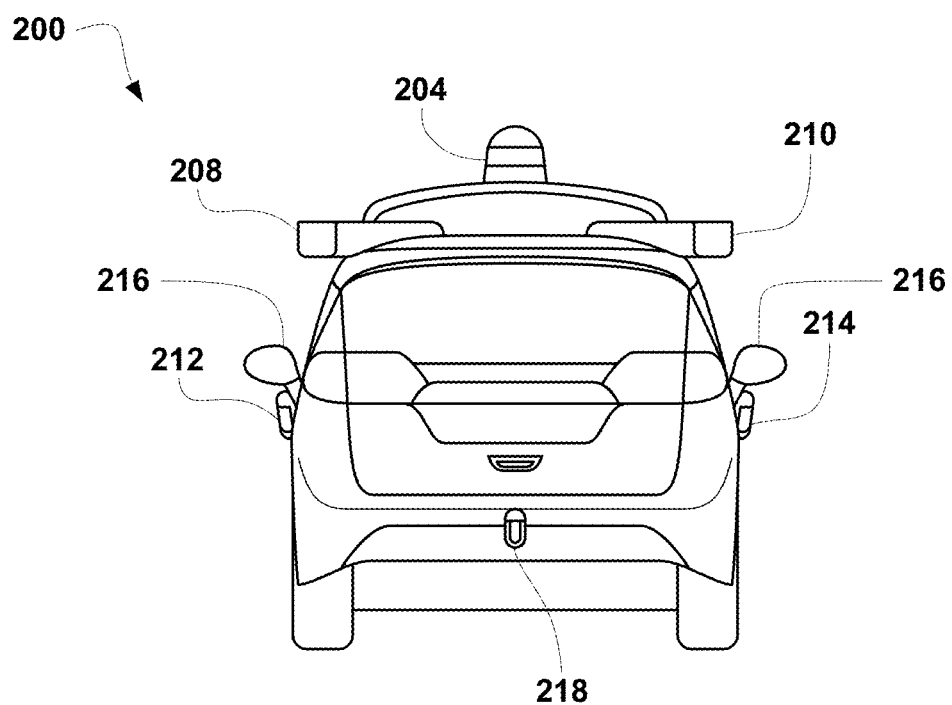
FIG. 2D is an illustration of a physical configuration of a vehicle, according to example embodiments.
Figure 2E:
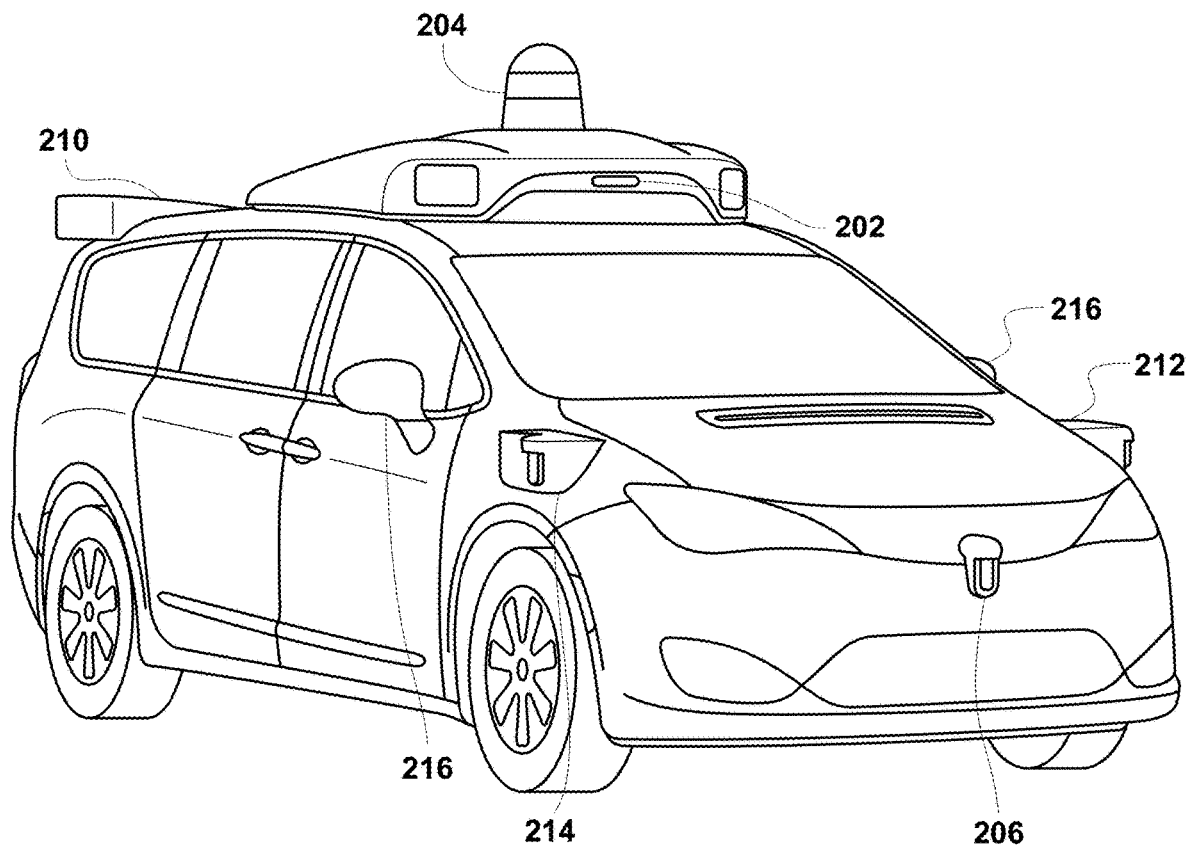
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. Overview

As a result of internal reflections within a camera (e.g., off of optics in the camera, off of mounting components in the camera, off of electronics in the camera, due to imperfections and/or misalignments of components within the camera, etc.), aberrations within captured images (e.g., payload images used for object identification) can be generated. As such, light from a scene may be directed to unintended or improper regions of an image sensor. For example, light entering a camera from a part of a scene that would normally be outside of a field of view of the camera may be internally reflected by a lens housing, redirected to the image sensor of the camera, and detected. Such extraneous light (i.e., stray light) may appear as veiling glare or lens flare within a captured image. Additionally or alternatively, stray light may appear as one or more ghost images within the captured image.

To enhance the quality of captured images (e.g., to improve object identification in computer-vision applications, such as autonomous vehicle applications), it may be desirable to identify and/or remove veiling glare, lens flare, ghost images, and/or other aberrations caused by stray light from captured images. Techniques described herein present ways of identifying and/or removing stray light captured by a camera.

Many cameras include a micro-lens array that overlays the image sensor. The micro-lens array may have a plurality of micro-lenses each corresponding to a light-sensitive pixel within the image sensor (e.g., to direct more of the light from the scene to the light-sensitive portion of the light-sensitive pixel). One technique described herein for identifying stray light includes positioning a slightly larger micro-lens (e.g., a micro-lens that overlays four pixels, nine pixels, or sixteen pixels) over a subset of light-sensitive pixels within the image sensor. Such a larger micro-lens may be installed in addition to or instead of the portion of the micro-lens array that would otherwise be present (e.g., a larger micro-lens over a 3×3 square of pixels may replace the nine smaller micro-lenses that would otherwise be present). This larger micro-lens may direct incoming light signals to one or more of the light-sensitive pixels within the subset (e.g., may direct an incoming light signal to one or more of the nine pixels in a 3×3 arrangement). Based on which of the underlying light-sensitive pixels receive light, and in what relative intensities, an angle of incidence for the incoming light signal may be determined. Such a determination may be made by a controller of the camera, for example. Alternatively, in some embodiments, such a determination may be made by a separate computing device (e.g., a server receiving a copy of the captured image, a laptop computing device receiving a copy of the captured image, or another related processor, such as a processor of a mobile computing device executing instructions stored within a memory of the mobile computing device to assess images captured by the camera).

In example embodiments, light coming from the target field of view of the scene is incident upon the subset of light-sensitive pixels at a perpendicular angle or near-perpendicular angle. Hence, there is a threshold angle of incidence above which it can be determined that the light signal being detected by the subset of light-sensitive pixels entered from some spurious direction and, therefore, corresponds to a stray light signal. Thus, by comparing the determined angle of incidence of the incoming light signal to a threshold angle of incidence, it can be determined whether the detected light signal is a stray light signal. If the light signal is a stray light signal, the stray light signal can be eliminated in post-processing (e.g., by selectively decreasing intensity in corresponding regions of stray light within payload images). Additionally or alternatively, the intensity of the stray light signal can be used to determine a true-black optical level for the camera. Still further, if stray light is determined to be present in a captured image, the pose of the camera can be adjusted, the lens of the camera can be adjusted, and/or one or more filters may be applied to the camera before additional images are captured.

These subsets of light-sensitive pixels used for stray light detection may be dedicated subsets of light-sensitive pixels, in some embodiments. In other words, these subsets of light-sensitive pixels may be used solely for stray light detection. As such, so as not to interfere with the bulk of captured payload images, these subsets of light-sensitive pixels may be positioned around a periphery of the image sensor (e.g., in a corner of the image sensor or along an edge of the image sensor). Alternatively or additionally, light-sensitive pixels used for stray light detection may be located in the bulk of the image sensor, such as near a center of the image sensor. Because these stray-light detection subsets can be relatively small (e.g., four pixels or nine pixels), they could be positioned in the bulk of the image sensor without causing too much disruption to a captured payload image. The image locations corresponding to these stray-light detection subsets in the bulk of the image sensor could be accounted for in post-processing, as well (e.g., based on the non-stray-light detecting light-sensitive pixels near the stray-light detecting light-sensitive pixels, the light from the scene incident on the stray-light detecting light-sensitive pixels may be estimated and integrated into a payload image).

In some embodiments, in order to more accurately identify the region(s) of the image sensor that might be susceptible to stray light, the entire periphery of the image sensor may include these stray-light determining subsets. Based on measurements of stray light along the entire periphery of the image sensor, the stray light within the bulk of the image sensor can be projected using interpolation (e.g., by generating a log-encoded or a gamma-encoded histogram that can be stored in a look-up table for later use).

Many cameras include multiple color channels (e.g., red, green, blue). Hence, because some of the light-sensitive pixels within the image sensor may be used to detect different colors (e.g., red, green, blue), there may be different stray-light determining subsets dedicated to each color (e.g., some subsets dedicated to red stray-light determinations, some subsets dedicated to green stray-light determinations, and some subsets dedicated to blue stray-light determinations). Each of the light-sensitive pixels in the underlying color-specific subset may correspond to the same color (e.g., nine red pixels under a single micro-lens, nine green pixels under a single micro-lens, or nine blue pixels under a single micro-lens). Using the information from these different color-specific subsets, multiple stray light maps could be generated for the image sensor (e.g., a red stray-light map, a green stray-light map, and a blue stray-light map). As such, these dedicated stray-light subsets may improve demosaicing, as well.

II. Example Systems

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/lidar 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). Further, such photodetectors can be arranged (e.g., through an electrical connection in series) into an array (e.g., as in a silicon photomultiplier (SiPM)).

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first lidar unit 204, a second lidar unit 206, a first radar unit 208, a second radar unit 210, a first lidar/radar unit 212, a second lidar/radar unit 214, and two additional locations 216, 218 at which a radar unit, lidar unit, laser rangefinder unit, and/or other type of sensor or sensor(s) could be located on the vehicle 200. Each of the first lidar/radar unit 212 and the second lidar/radar unit 214 can take the form of a lidar unit, a radar unit, or both.

Furthermore, the example vehicle 200 can include any of the components described in connection with vehicle 100 of FIG. 1. The first and second radar units 208, 210 and/or the first and second lidar units 204, 206 can actively scan the surrounding environment for the presence of potential obstacles and can be similar to the radar 126 and/or laser rangefinder/lidar 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, lidars, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first lidar/radar unit 212 and the second lidar/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
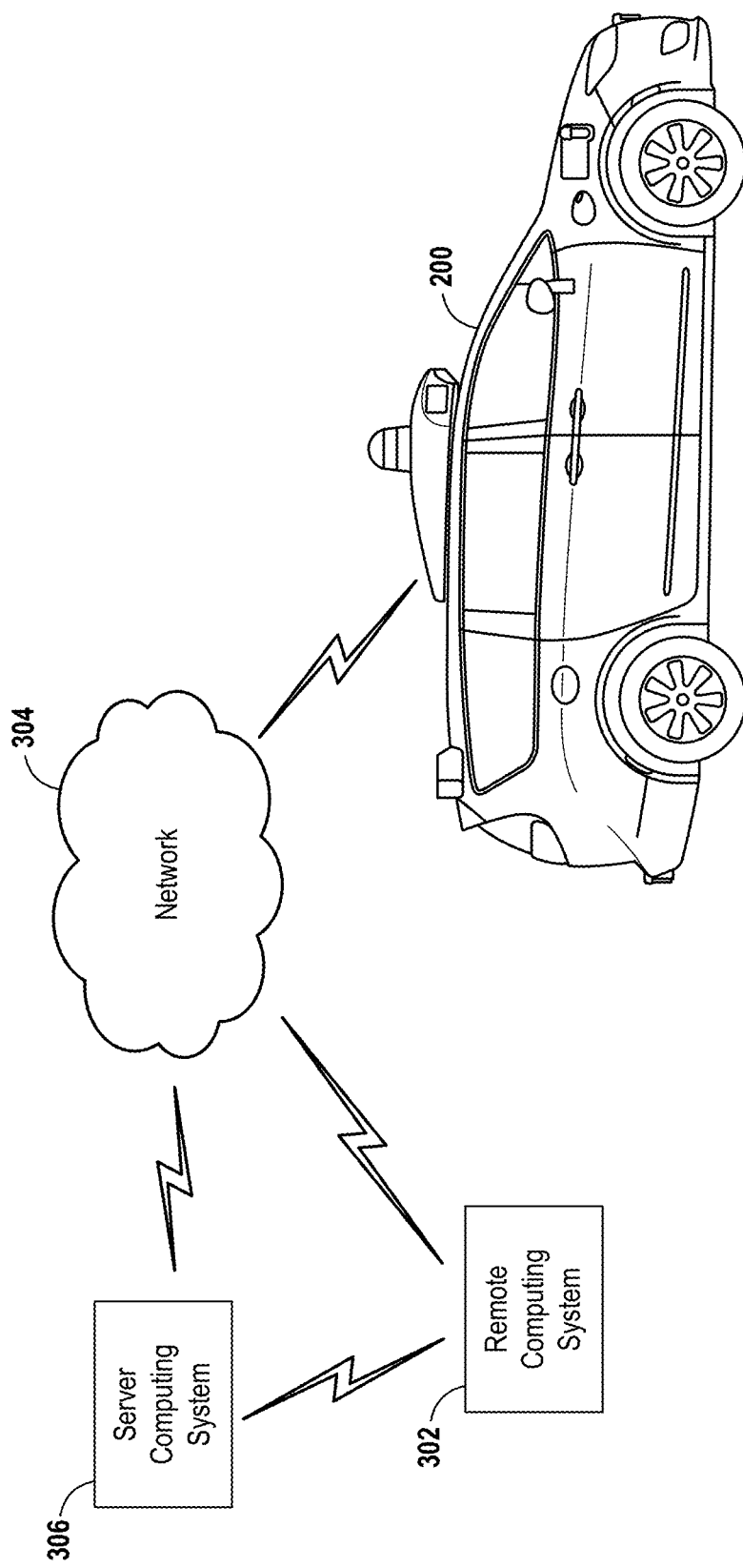
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., laser) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
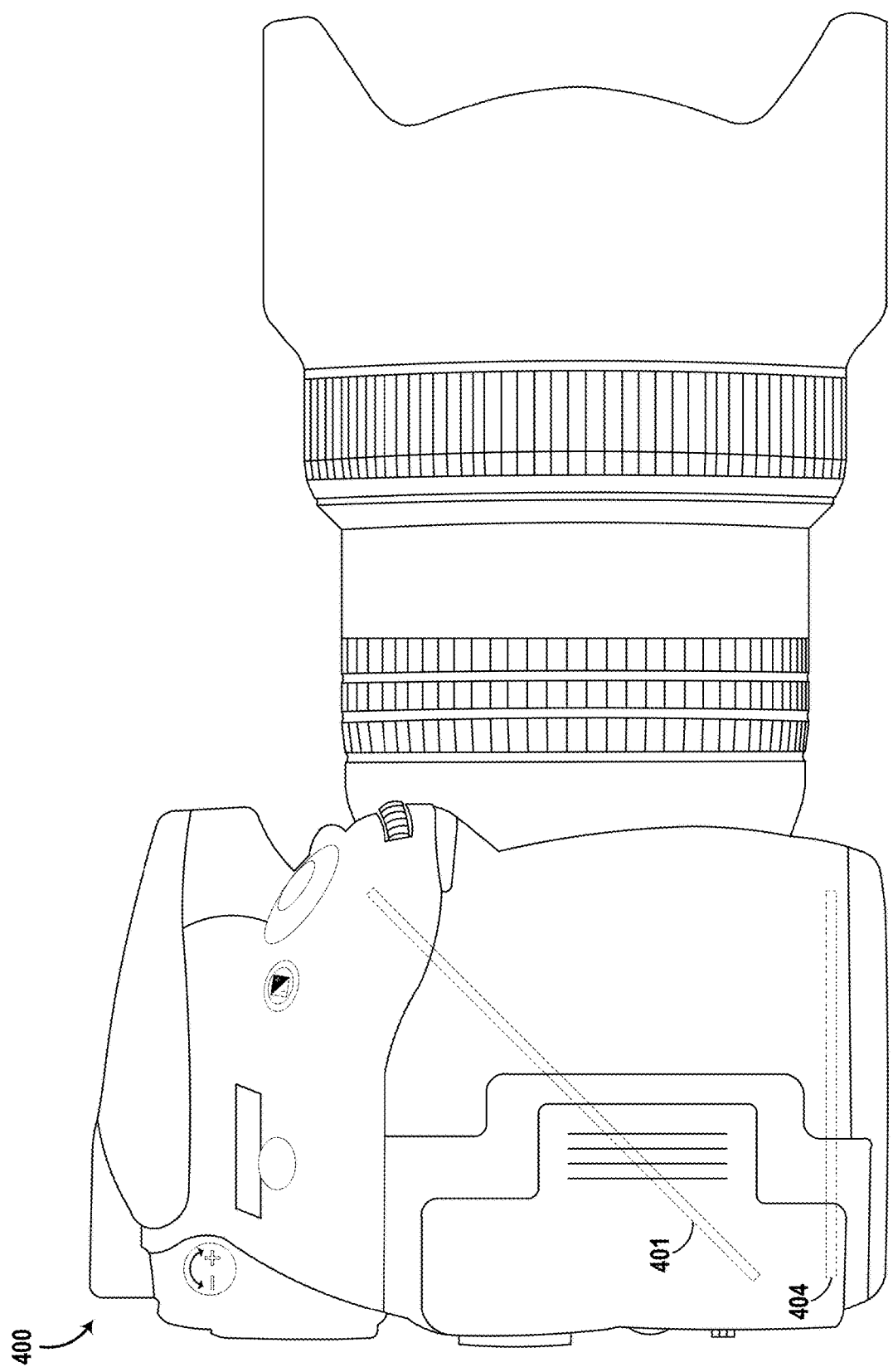
FIG. 4A is an illustration of a camera, according to example embodiments.

FIG. 4A is an illustration of a camera 400, according to example embodiments. The camera 400 may include one or more lenses housed within a lens barrel of the camera 400. The camera 400 may also include an image sensor 404. The image sensor 404 may receive light from the scene via the one or more lenses housed within the lens barrel and a mirror 401. In some embodiments, the camera 400 may also include additional components (e.g., shutter buttons, viewfinders, flashes, batteries, electronic storage for recording captured images, display screens, selection buttons, etc.). Further, in some embodiments, the mirror 401 may move (e.g., the mirror 401 may rotate relative to the lens such that light from the scene can be selectively directed to a viewfinder of the camera 400 or to the image sensor 404 of the camera 400).

In some embodiments, one or more of the camera 400 components may be controlled manually by a user of the camera 400. For example, the lens barrel may be configured to rotate about its axis to modify the relative positions of the one or more lenses within the lens barrel, thereby adjusting a field of view and/or a zoom of the camera 400. Alternatively, one or more of the components of the camera 400 may be electronically controlled (e.g., a camera controller may adjust one or more of the lenses within the lens barrel to modify a zoom of the camera, such as during an autofocus procedure).

While a digital single-lens reflex (DSLR) camera is illustrated in FIG. 4A, it is understood that FIG. 4A is solely provided as an example. In alternate embodiments, other form factors may be used. For example, in some embodiments, the camera 400 may only include an image sensor behind one or more lenses (e.g., a telecentric lens). Other arrangements are also possible. In some embodiments, for instance, the camera may include one or more optical filters (e.g., polarization filters, chromatic filters, neutral-density filters, etc.) and/or one or more electronic stages and/or motors configured to adjust the position of one or more components of the camera. Further, in some embodiments, the camera 400 may be used for object detection and avoidance within an autonomous vehicle (e.g., like the camera 130 illustrated and described with reference to FIG. 1). In some embodiments, the camera 400 may be adversely impacted by stray light incident on the image sensor 404 (e.g., based on the mechanisms described with reference to FIGS. 4B-4D). It is understood that the techniques described herein for detecting and/or mitigating the stray light may be applicable to any form factor of camera and/or image sensor. For example, the techniques described herein may determine an amount and/or location of stray light incident on an image sensor within an autonomous vehicle camera (e.g., with one or more associated camera optics), a webcam, a cellphone camera, a DSLR (as illustrated in FIG. 4A), a backup camera on a vehicle, a closed-circuit television camera, a highspeed camera, etc. Additionally, the techniques described herein may equally be applied to cameras that digitally record images as well as cameras that chemically record images (e.g., on film).

FIG. 4B illustrates an optical detector system 410. The optical detector system 410 may be a component of a camera (e.g., the camera 130 shown and described with reference to FIG. 1 and/or the camera 400 illustrated in FIG. 4A). In some embodiments, the optical detector system 410 may be used to capture images of an environment surrounding a vehicle (e.g., the vehicle 200 illustrated in FIG. 2). Such images may be captured for object detection and avoidance, to determine the amount of stray light incident on the image sensor 404, or for both object detection and avoidance and to determine the amount of stray light incident on the image sensor 404. As illustrated, the optical detector system 410 may include a body 402 (e.g., which may include a lens barrel), an image sensor 404, a first lens 412, and a second lens 414.

The body 402 may provide a rigid housing for the rest of the components of the optical detector system 410. Further, the rest of the components in the optical detector system 410 may be attached to the housing so as to provide a proper alignment and relative position of the remaining components. For example, the first lens 412 and the second lens 414 may be attached to a lens-barrel portion of the body 402 such that the first lens 412 and the second lens 414 are separated by a predetermined distance and such that the first lens 412 and the second lens 414 are properly aligned with one another and the image sensor 404. Additionally, in some embodiments, the inner surface of the body 402 may be made of and/or coated with an anti-reflective material (e.g., blackened steel) to mitigate internal reflections. In addition to or instead of using an anti-reflective material on an inner surface of the body 402, in some embodiments, the first lens 412 and/or the second lens 414 may be coated with an anti-reflective material to mitigate internal reflections.

FIGS. 4B-4D are provided as examples. It is understood that in alternate embodiments contemplated herein, the optical detector system 410 may include greater or fewer lenses (e.g., three lenses, four lenses, five lenses, etc.), lenses with different orientations, lenses of different styles (e.g., as opposed to the plano-convex first lens 412 and the convex second lens 414 illustrated), different separations of lenses, or lenses with different focal lengths. Further, it is understood that, in some embodiments, the optical detector system 410 may include additional or alternative imaging optics. For example, the optical detector system 410 may include one or more mirrors, one or more apertures, one or more optical filters, etc. In some embodiments, the optical detector system 410 may include an adjustable focus arrangement (e.g., a set of lenses that may be translated with respect to one another adjust an associated focal point). Such adjustable focus arrangements may be manually adjusted or adjusted in an automated fashion (e.g., by a controller configured to reorient/translate stages on which each of the lenses is mounted; the controller may adjust the focus of the lens arrangement based on the quality of a captured image, e.g., to autofocus the optical detector system 410).

The image sensor 404 may be configured to capture an image of the environment surrounding the optical detector system 410 (i.e., the scene) by intercepting light signals from the environment via the first lens 412 and the second lens 414. The image sensor 404 may include various light detectors or detector arrays to enable the detection of such light signals. For example, in various embodiments, the image sensor 404 may include an array of single photon avalanche detectors (SPADs), an array of avalanche photodiodes (APDs), one or more silicon photomultipliers (SiPMs), an array of photodiodes, an array of phototransistors, an array of active pixel sensors (APSs), one or more CCDs, one or more cryogenic detectors, etc. In some embodiments, the optical detector system 410 may also include or be connected to a memory (e.g., a non-transitory, computer-readable medium, such as a hard drive) configured to store (e.g., as a series of digital bits in a pixel by pixel arrangement) images captured by the image sensor 404.

Optical detector systems, such as the optical detector system 410 illustrated in FIG. 4B, can be susceptible to internal reflections (e.g., which may appear on the image sensor 404 as stray light and/or a ghost image). For example, imperfections (e.g., impurities, cracks, air bubbles, scratches, dirt, dust, bug splatters, degradation of lens coatings, condensation, debris, imperfect transparency, etc.) within or on one of the lenses can lead to additional light signals (i.e., stray light signals) intersecting the image sensor 404 based on a single primary light signal. As illustrated in FIG. 4B, a primary light signal 422 may be transmitted by an object 420 (e.g., a bright object, such as the sun, that has high intensity relative to the other objects in the scene) in the surrounding environment of the optical detector system 410. Upon entering the optical detector system 410 and interacting with the first lens 412, for example, the primary light signal 422 may split into a reduced-intensity primary light signal 424, secondary light signals 426, and tertiary light signals 428. The reduced-intensity primary light signal 424, the secondary light signals 426, and the tertiary light signals 428 may be different intensities from one another.

In other embodiments, the primary light signal 422 may separate into greater or fewer additional light signals upon interacting with the first lens 412. Additionally or alternatively, any light signals generated based on the interaction of the primary light signal 422 with the first lens 412 may further generate additional light signals based on interactions with additional lenses in the optical detector system 410 (e.g., in some embodiments, the secondary light signals 426 or the tertiary light signals 428 may each further split into multiple light signals based on their interactions with the second lens 414). It is understood that the angles of the secondary light signals 426 and the tertiary light signals 428 relative to the reduced-intensity primary light signal 424 and the primary light signal 422 are illustrated only as examples. In other embodiments, the relative angles of the secondary light signals 426 or the tertiary light signals 428 may be different (e.g., based on the wavelength(s) of the primary light signal 422, the material composition of the first lens 412, the respective defects in the first lens 412, the ambient temperature, the ambient air pressure, the lens shape of the first lens 412, etc.).

As a result of the additional light signals (e.g., the secondary light signals 426 and the tertiary light signals 428) generated by the interaction of the primary light signal 422 with the first lens 412, an image captured by the image sensor 404 of the surrounding environment may be distorted and/or imprecise. In some embodiments, the object 420 may appear to be a different shape, size, and/or intensity than it otherwise would as a result of such imperfections in the optical detector system 410. For example, a veiling glare, lens flare, or ghost images (each being forms of stray light) may be present in an image of the object 420 captured by the image sensor 404, thereby obscuring the object 420 within the captured image or obscuring other portions of the captured image. This may prevent observation of relatively faint objects that are positioned close to bright objects within the captured image (e.g., a pedestrian standing in front of the sun relative to the optical detector system 410 may be washed out by the sun, particularly if the veiling glare generated in the optical detector system 410 by the sun is severe). Further, such veiling glare, lens flare, or ghost images can adversely affect an ability of the image sensor 404 to capture images with a high dynamic range.

Other optical mechanisms can give rise to images captured by the image sensor 404 that do not precisely reflect the surrounding scene (e.g., can give rise to veiling glare, lens flare, or ghost images). For example, primary light signals 422 from objects 420 may be reflected from the incident face of one or more of the lens. For instance, as illustrated in FIG. 4C, the primary light signal 422 may be reflected by the front face of the second lens 414 to generate a reflected light signal 432. The reflected light signal 432 may then reflect off of the back face of the first lens 412, be transmitted through the second lens 414, and then intersect with the image sensor 404, as illustrated. As with the mechanism illustrated in FIG. 4B, the mechanism illustrated in FIG. 4C could result in veiling glare, lens flare, or ghost images that obscure objects within images captured by the image sensor 404 or cause the source object 420 to have an inaccurate intensity, shape, or size. It is understood that the angle of the reflected light signal 432 relative to the reduced-intensity primary light signal 424 and the primary light signal 422 are illustrated only as an example. In other embodiments, the relative angle of the reflected light signal 432 may be different (e.g., based on the wavelength(s) of the primary light signal 422, the material composition of the second lens 414, the respective defects in the second lens 414, the ambient temperature, the ambient air pressure, the lens shape of the second lens 414, the position of the object 420 relative to the optical detector system 410, etc.). Further, in some embodiments, there may be multiple reflected light signals generated based on the primary light signal 422.

Another optical mechanism that can give rise to stray light in captured images is illustrated in FIG. 4D. As illustrated, the primary light signal 422 may be reflected off of an interior surface of the body 402 (e.g., a lens-barrel portion of the body 402) to generate a reflected light signal 442. Also as illustrated, in some embodiments, the primary light signal 422 may be partially reflected by the interior surface of the body 402 and partially absorbed by the interior surface of the body 402, resulting in a reflected light signal 442 that has a reduced intensity compared with the primary signal 422.

After being generated, the reflected light signal 442 may then be transmitted to the image sensor 404. As with the mechanisms illustrated in FIGS. 4B and 4C, the mechanism illustrated in FIG. 4D could obscure objects within images captured by the image sensor 404. Further, the mechanism illustrated in FIG. 4D could lead to light from objects that would otherwise not be captured to be captured by the image sensor 404 (i.e., objects outside of a field of view of the optical detector system 410 may produce light that is nonetheless captured by the image sensor 404). It is understood that the angle of the reflected light signal 442 relative to the primary light signal 422 is illustrated only as an example. In other embodiments, the relative angle of the reflected light signal 442 may be different (e.g., based on the wavelength(s) of the primary light signal 422, the material composition of the inner surface of the body 402, the material composition of a coating on the inner surface of the body 402, the ambient temperature, the ambient air pressure, the position of the object 420 relative to the optical detector system 410, the shape of a lens-barrel portion of the body 402, etc.). Further, in some embodiments, there may be multiple reflected light signals generated based on the primary light signal 422.

As illustrated in FIGS. 4B-4D, some stray light may intersect the image sensor 404 at a large angle of incidence relative to the surface of the image sensor 404 and some stray light may intersect the image sensor 404 with a small angle of incidence relative to a normal vector extending from the surface of the image sensor 404. In alternate embodiments, it is possible that stray light only insects the image sensor 404 at large angles of incidence or only at small angles of incidence. Further, while stray light might intersect the image sensor 404 at either small or large angles (as illustrated in FIGS. 4B-4D), object light from the surrounding environment that is to be imaged may intersect the image sensor 404 at small angles only. Hence, any light that intersects the image sensor 404 at a large angle of incidence relative to a normal vector extending from the surface of the image sensor 404 may correspond to stray light, whereas there may be ambiguity regarding light that intersects the image sensor 404 at a small angle of incidence as to whether that light corresponds to object light or stray light. Such insight can be used to identify and/or eliminate stray light within images captured by the image sensor 404 using the techniques described herein.

Figure 5:
FIG. 5 is an image of a scene that includes a bright object, according to example embodiments.

Based on the mechanisms described above and illustrated in FIGS. 4B-4D, stray light can be generated within the optical detector system 410 based on light signals generated by objects 420 within the environment surrounding the optical detector system 410. FIG. 5 illustrates an image captured by an image sensor 404 of an optical detector system 410 that has veiling glare and lens flare present (e.g., as a result of one or more of the mechanisms described with reference to FIGS. 4B-4D). Such an image may be referred to herein as a captured image 502 with glare. Other types of stray light (besides veiling glare and lens flare) within captured images (e.g., ghost images of one or more objects in the environment) are also possible.

As a result of the generated glare, regions of the captured image 502 may have locations of higher intensity than they otherwise would have without such glare. For example, the captured image 502 has high-intensity regions near the position of the sun within the captured image 502, as illustrated. Such artificially increased intensity regions may adversely affect object detection and/or identification (e.g., for object detection and avoidance within an autonomous vehicle).

In some embodiments, the optical detector system 410 used to capture images upon which stray light evaluations are made may be an optical detector system 410 used for object detection and avoidance. For example, the captured images may be images that can be used to identify certain objects within a scene, but can also be used to identify one or more locations of stray light incident upon the image sensor 404. Additionally or alternatively, one or more images may be captured solely to identify locations of stray light incident on the image sensor 404. Thereafter, stray light may be mitigated for later captured images (e.g., in post-processing of those captured images based on the stray light determination image and/or by employing one or more stray light mitigation optics, such as a neutral-density filter). In extreme cases of stray light, the camera associated with the optical detector system 410 may be decommissioned (e.g., if it is determined that the stray light incident on the image sensor 404 cannot be accounted for in future images and if the stray light is so egregious that the captured images could not be used for object detection and avoidance within a corresponding autonomous vehicle).

Figure 6A:
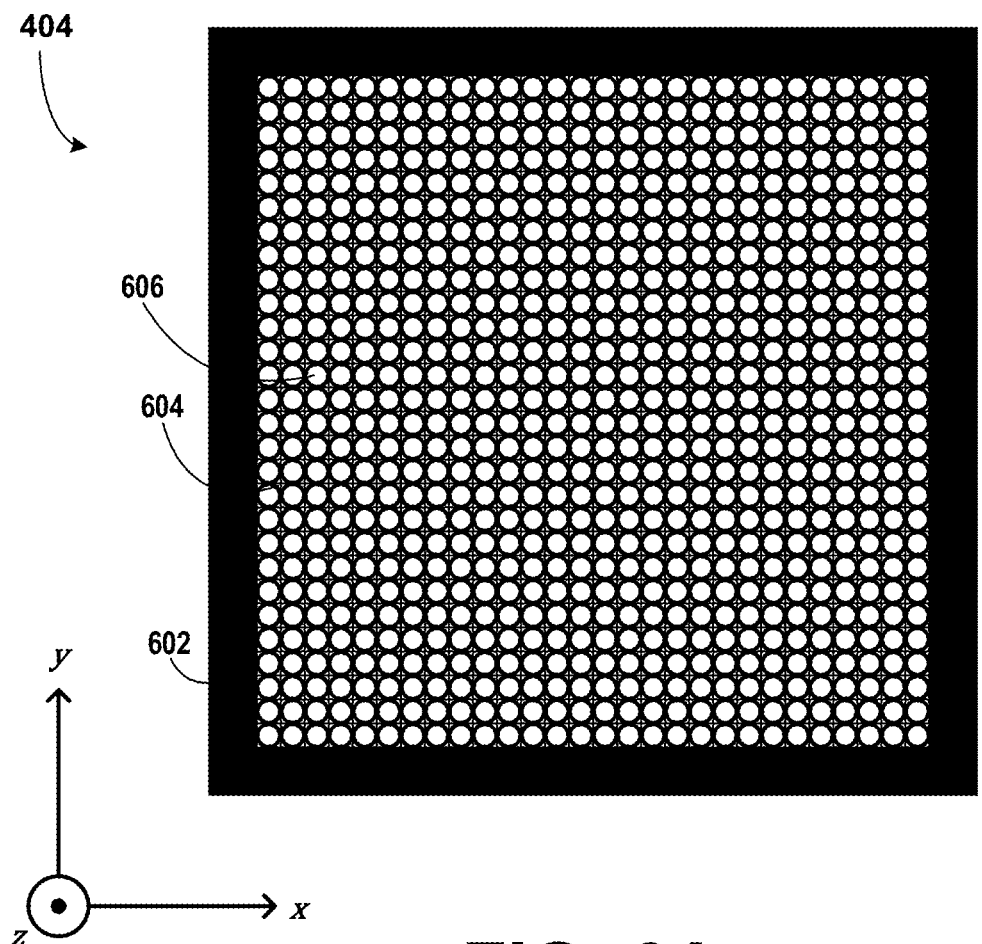
FIG. 6A is an illustration of an image sensor.
Figure 6B:
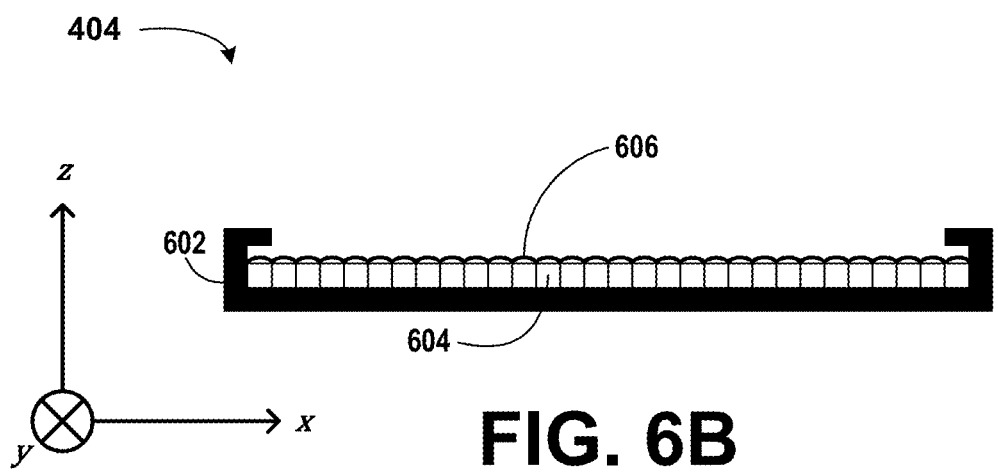
FIG. 6B is an illustration of an image sensor.

FIG. 6A is an illustration of an image sensor (e.g., the image sensor 404 illustrated in FIGS. 4A-4D). The image sensor 404 is shown in a top-view perspective (e.g., from a perspective along the positive z-axis, as illustrated). FIG. 6B shows a cutaway of the image sensor 404 from a side-view perspective (e.g., a cross-section taken along they-axis). The image sensor 404 may include a plurality of light-sensitive pixels 604 mounted into an image sensor mount 602. The light-sensitive pixels 604 may detect light signals from a surrounding environment to produce an image (e.g., each of the light-sensitive pixels 604 may convert optical energy into electrical energy that is stored within a memory of a computing device and the intensities of the electrical energies from each pixel may be arranged to form an image).

Further, the image sensor 404 may include a plurality of microlenses 606. Each of the microlenses 606 may be positioned over a respective light-sensitive pixel 604 to maximize the amount of signal from the surrounding environment that is directed to the light-sensitive portion of each light-sensitive pixel 604. For example, the microlenses 606 may conically focus any light incident on the face of the microlens 606 onto a detection surface of the light-sensitive pixel 604. The microlenses 606 may be shaped as bubbles or other convex structures, in some embodiments.

As illustrated in FIG. 6B, in some embodiments the image sensor mount 602 may cover one or more of the light-sensitive pixels 604 (e.g., may occlude one or more of the light-sensitive pixels 604 located around a periphery of the image sensor 404). As such, signals from the light-sensitive pixels 604 covered by the image sensor mount 602 may be removed from captured images in post-processing. The image sensor 404 illustrated in FIGS. 6A and 6B may not be capable of determining the presence of stray light, unlike the image sensors described below with reference to FIGS. 7A-10, for example.

Figure 7A:
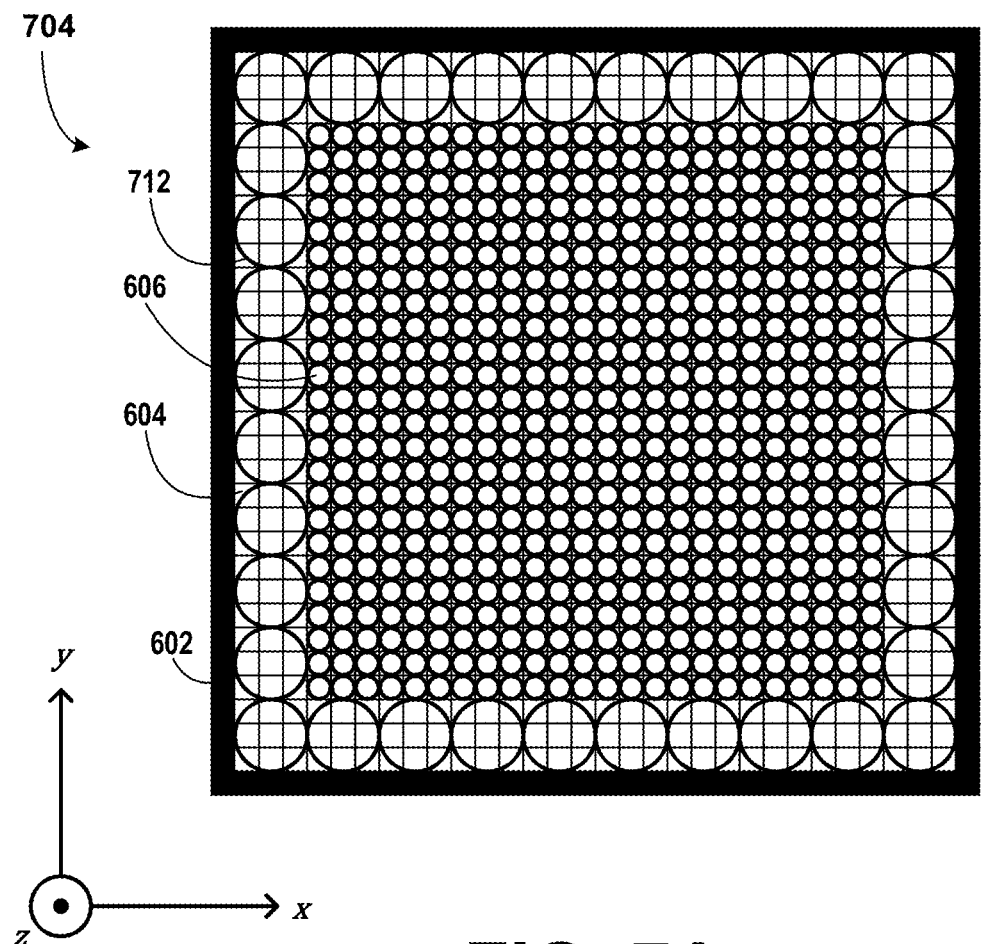
FIG. 7A is an illustration of an image sensor, according to example embodiments.
Figure 7B:
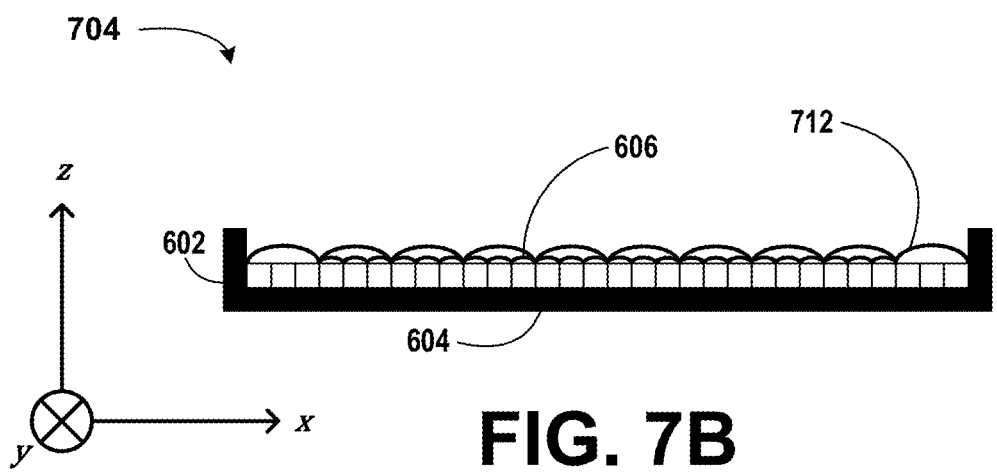
FIG. 7B is an illustration of an image sensor, according to example embodiments.

FIG. 7A is an illustration of an image sensor 704, according to example embodiments. The image sensor 704 is shown in a top-view perspective (e.g., from a perspective along the positive z-axis, as illustrated). FIG. 7B shows a cutaway of the image sensor 704 from a side-view perspective (e.g., a cross-section taken along the y-axis). Similar to the image sensor 404 illustrated in FIGS. 6A and 6B, the image sensor 704 may include a plurality of light-sensitive pixels 604 mounted into an image sensor mount 602 and an associated plurality of microlenses 606. However, unlike the image sensor 404 of FIGS. 6A and 6B, the image sensor 704 of FIGS. 7A and 7B may include a plurality of stray-light microlenses 712. The stray-light microlenses 712 may be used to detect the presence of stray light incident on the light-sensitive surfaces of the light-sensitive pixels 604. To accomplish this, in some embodiments, the stray-light microlenses 712 may be conically shaped (e.g., with a convex outer surface), hemispherically shaped, bubble-shaped, or otherwise convexly shaped so as to focus light signals that intersect a surface of the stray-light microlens 712. It is understood that FIGS. 7A and 7B are examples and not necessarily to-scale. Further, in some embodiments, a greater percentage of the surface area of the image sensor 404 may be occupied by microlenses 606 compared to stray-light microlenses 712 than is illustrated in FIGS. 7A and 7B (e.g., there may be fewer stray-light microlenses 712 compared to other microlenses 606 than is illustrated).

The microlenses 606 and/or the stray-light microlenses 712 may be fabricated using a variety of techniques. For example, the microlenses 606 and/or the stray-light microlenses 712 may be fabricated using photolithography into curable epoxy (e.g., ultraviolet curable epoxy) and/or photoresist and then melting the polymer to form an array. Alternatively, the microlenses 606 and/or the stray-light microlenses 712 may be fabricated using molding or embossing from a mold or replication of an electroform using a master mandrel of the array.

In some embodiments, as illustrated in FIGS. 7A and 7B, the stray-light microlenses 712 may be larger than the rest of the microlenses 606 (e.g., may be positioned over two, four, nine, sixteen, etc. light-sensitive pixels 604 in a 1×1 array, a 2×2 array, a 3×3 array, a 4×4 array, etc., respectively, or in a non-square array of light-sensitive pixels). Also as illustrated, in place of the microlenses 606, the stray-light microlenses 712 may be positioned over the corresponding subset of light-sensitive pixels 604. Further, as illustrated in FIG. 7A, the stray-light microlenses 712 and the corresponding underlying subsets of light-sensitive pixels 604 may be positioned along a periphery of the image sensor 704 (e.g., in a corner of the image sensor 704, as illustrated). It is understood that this is solely provided as an example. In alternate embodiments (e.g., as illustrated in FIGS. 9A-10B), the stray-light microlenses 712 and corresponding underlying subsets of light-sensitive pixels 604 may be positioned in other regions of the image sensor 704. Additionally, in some embodiments, one or more of the stray-light microlenses 712 may be positioned partially or wholly underneath a mount of the image sensor 704 (e.g., an overhanging image sensor mount similar to the image sensor mount 602 illustrated in FIGS. 6A and 6B). In this way, light-sensitive pixels 604 that would otherwise go unused for detecting a surrounding scene could be used to detect stray light incident on the image sensor 704 using an associated stray-light microlens 712.

In alternate embodiments, one or more of the stray-light microlenses 712 may be the same size as the rest of the microlenses 606 and/or smaller than the rest of the microlenses 606. Further, in some embodiments, different stray-light microlenses corresponding to a single image sensor may be different sizes and/or sizes (e.g., one stray-light microlens may be larger than another stray-light microlens and/or one stray-light microlens may have a different associated focal plane than another stray-light microlens).

As illustrated in FIGS. 7A and 7B, the image sensor 704 may include a plurality of stray-light microlenses 712 over a corresponding plurality of subsets of light-sensitive pixels 604. While each of the stray-light microlenses 712 in FIG. 7A is the same size and shape and overlays the same number of corresponding light-sensitive pixels 604, it is understood that, in some embodiments, one or more of the stray-light microlenses 712 could have a different size and/or shape from one or more of the other stray-light microlenses 712.

Figure 7C:
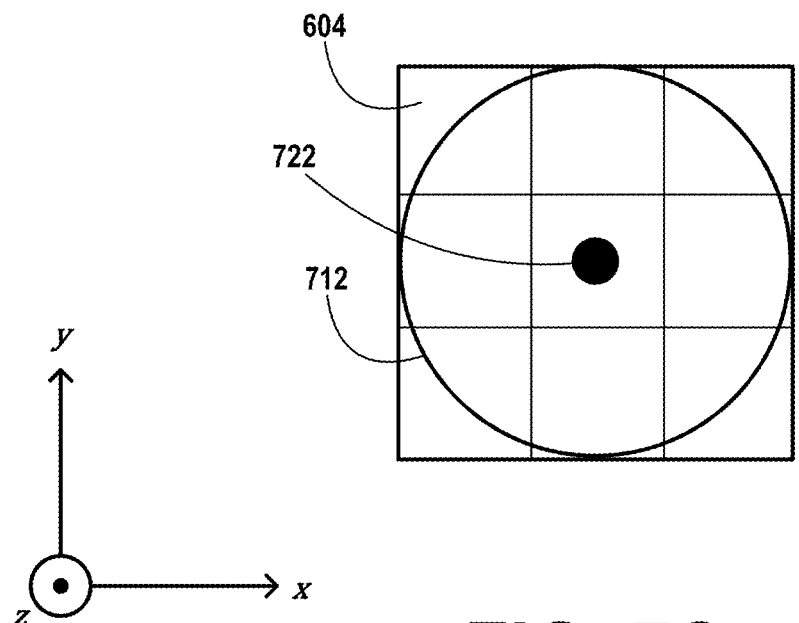
FIG. 7C is an illustration of a subset of light-sensitive pixels with an associated lens, according to example embodiments.
Figure 7D:
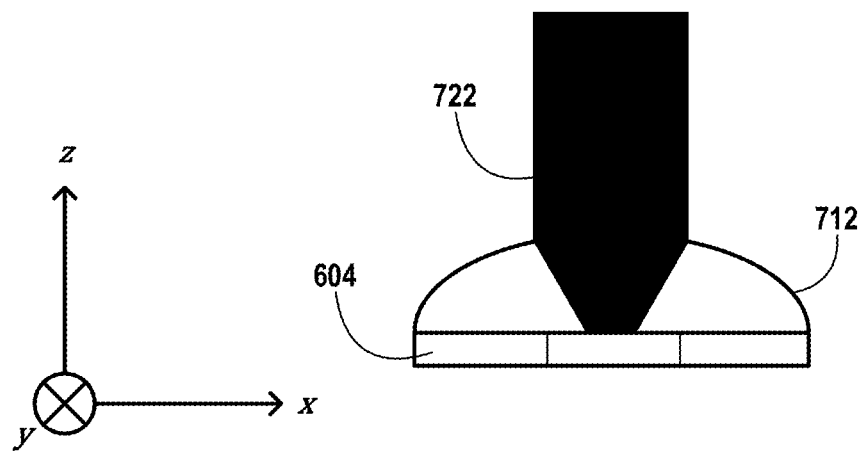
FIG. 7D is an illustration of a subset of light-sensitive pixels with an associated lens, according to example embodiments.

The stray-light microlenses 712 may direct light from a receiving surface (e.g., a convex surface) of the stray-light microlens 712 onto one or more of the underlying light-sensitive pixels 604. This is illustrated in FIGS. 7C-7F, for example. FIG. 7C illustrates a single stray-light microlens 712 overlaying a subset of nine light-sensitive pixels 604 from a top-view perspective (e.g., from a perspective along the positive z-axis, as illustrated). FIG. 7D shows a cutaway of the same thing (e.g., a cross-section taken along the y-axis). Also illustrated in FIGS. 7C and 7D is a light signal 722 incident on the stray-light microlens 712 (e.g., the resulting spot generated by the light signal 722 intersecting the surface of the light-sensitive pixels 604 is illustrated in FIG. 7C and the incoming light signal 722 is illustrated in FIG. 7D). Because the light signal 722 is incident perpendicularly to or approximately perpendicularly to a surface of the light-sensitive pixels 604 (i.e., at a low angle, such as lower than 15°, of incidence relative to a vector extending perpendicularly from a surface of the light-sensitive pixels 604), the stray-light microlens 712 may focus the light signal 722 onto a middle region of the underlying light-sensitive pixels 604. For example, as illustrated in FIGS. 7C and 7D, the light signal 722 is directed to a center portion of the detection surface of the middle of nine underlying light-sensitive pixels 604.

It is understood that FIGS. 7C and 7D are provided solely as examples. In some embodiments, a light signal incident perpendicularly to or approximately perpendicularly to a surface of the light-sensitive pixels 604 may be spread across all of the underlying light-sensitive pixels 604, but in unequal intensities (e.g., a larger intensity on light-sensitive pixels 604 near a center of the underlying subset of light-sensitive pixels 604 and smaller intensities on peripheral light-sensitive pixels 604 of the underlying subset of light-sensitive pixels 604). Regardless of the exact distribution, though, the light signal will be distributed to a predetermined region of the underlying light-sensitive pixels 604 when incident perpendicularly to or approximately perpendicularly to a surface of the light-sensitive pixels 604.

Figure 7E:
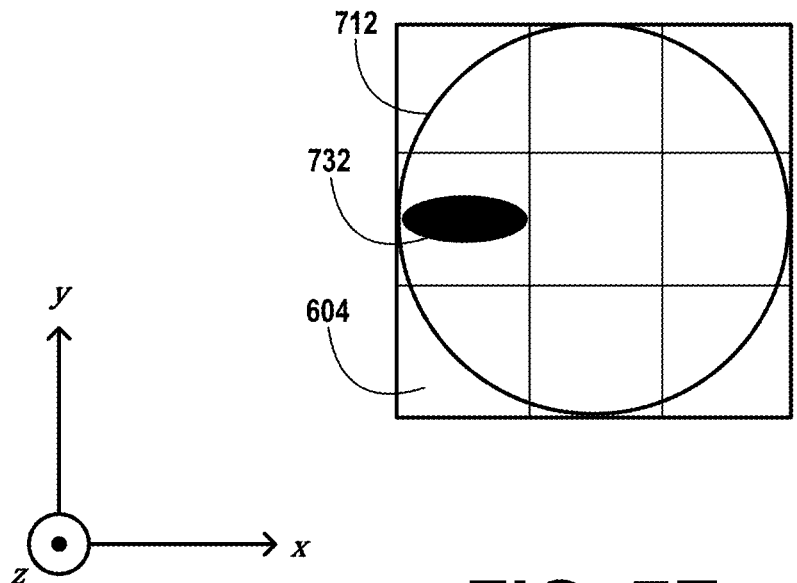
FIG. 7E is an illustration of a subset of light-sensitive pixels with an associated lens, according to example embodiments.
Figure 7F:
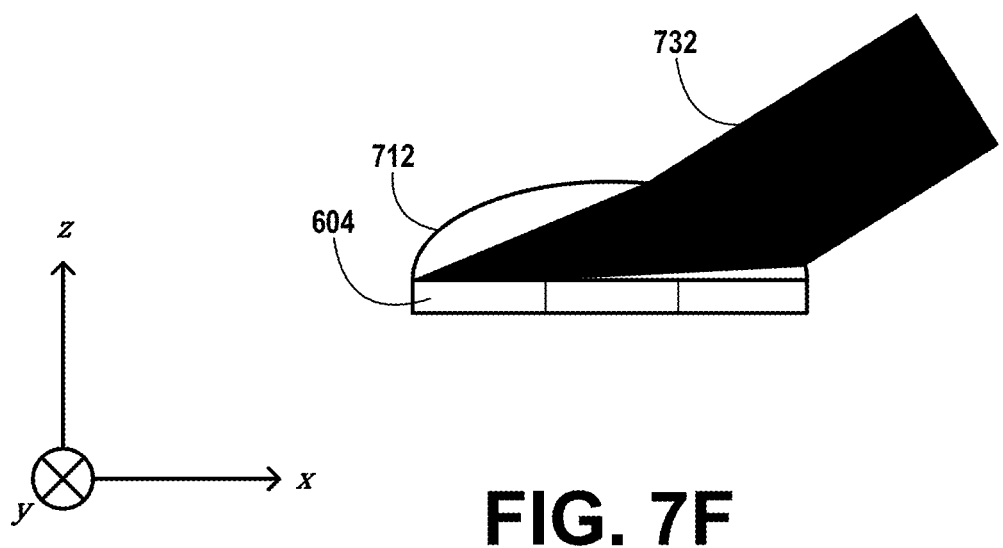
FIG. 7F is an illustration of a subset of light-sensitive pixels with an associated lens, according to example embodiments.

Similarly, when a light signal is obliquely incident to a surface of the light-sensitive pixels 604 (e.g., at a high angle, such as greater than 15°, of incidence relative to a vector extending perpendicularly from a surface of the light-sensitive pixels 604), the stray-light microlens 712 may distribute the light signal across a region of the underlying light-sensitive pixels 604 that is away from a center region of the underlying light-sensitive pixels 604. This is illustrated in FIGS. 7E and 7F, for example. Like FIG. 7C, FIG. 7E illustrates the stray-light microlens 712 overlaying the subset of nine light-sensitive pixels 604 from a top-view perspective (e.g., from a perspective along the positive z-axis, as illustrated). Similarly, FIG. 7F, like FIG. 7D, shows a cutaway (e.g., a cross-section taken along the y-axis) of the stray-light microlens 712 and the light-sensitive pixels 604.

Unlike FIGS. 7C and 7D, though, FIGS. 7E and 7F illustrate an oblique light signal 732 incident on the stray-light microlens 712 (e.g., the resulting spot generated by the oblique light signal 732 intersecting the surface of the light-sensitive pixels 604 is illustrated in FIG. 7E and the incoming oblique light signal 732 is illustrated in FIG. 7F). As illustrated in FIGS. 7E and 7F, when the oblique light signal 732 contacts a surface of the stray-light microlens 712, the oblique light signal 732 may be directed to a peripheral portion of the surface of light-sensitive pixels 604 (e.g., a light-sensitive pixel 604 along an edge of the subset of light-sensitive pixels 604 underneath the stray-light microlens 712 may receive all or a majority of the intensity of the oblique light signal 732).

Based on the different intensity distributions associated with the incoming light signals 722, 732 illustrated in FIGS. 7C and 7D when compared to FIGS. 7E and 7F, a determination of an angle of incidence of the light signal can be made by comparing the relative intensities detected by each light-sensitive pixel 604 in the subset of light-sensitive pixels 604 underlying the respective stray-light microlens 712. For example, a processor (e.g., a controller associated with the image sensor 704, a controller associated with a camera of which the image sensor 704 is a component, a controller associated with an autonomous vehicle of which the image sensor 704 is a component, or a server computing device to which the image sensor 704 has communicated a captured image) may determine a first angle of incidence of a first light signal detected by the subset of light-sensitive pixels 604 underlying the stray-light microlens 712.

Because higher angles of incidence are more frequently associated with stray light than with a light signal from an object in the surrounding environment, once a determination of an angle of incidence is made, a determination can be made about whether the incident light signal constitutes stray light. For example, a processor (e.g., a controller that made a determination about the angle of incidence of one or more light signals detected by the light-sensitive pixels 604) may determine an amount of stray light incident on the image sensor 704 (e.g., incident on the light-sensitive pixels 604 of the image sensor 704 underlying the stray-light microlens 712) based on the determined angle of incidence. This determination may be made by comparing a determined angle of incidence to a threshold angle of incidence (e.g., about 5°, about 10°, about 15°, about 20°, about 25°, about 30°, etc.). The threshold angle of incidence may be measured relative to a vector that extends perpendicularly from a surface of the image sensor 704. If the determined angle of incidence is greater than the threshold angle, the incident light signal may be identified as a stray light signal. The threshold angle may be based on the geometry and/or materials of the image sensor 704 and/or the geometry and/or materials of the stray-light microlenses 712. Alternatively, the threshold angle may be determined by the processor based on one or more environmental factors and/or may be set by a user of the camera (e.g., a user may set a lower threshold angle of incidence to identify more light as stray light). In some embodiments, the underlying light-sensitive pixels 604 may simultaneously detect stray light signals and non-stray light signals. Hence, a determination could also be made regarding what percentage of the light intensity incident on the underlying subset of light-sensitive pixels 604 corresponds to stray light and what percentage corresponds to object light. For example, if 50% of the received light were incident on the center light-sensitive pixel 604 underlying the stray-light microlens 712 and 50% of the received light were incident on a peripheral light-sensitive pixel 604 underlying the stray-light microlens 712, it may be determined that 50% of the light received at that portion of the image sensor 704 corresponds to stray light.

Each of the stray-light microlenses 712 illustrated in FIG. 7A may be used to make a similar determination about stray light incident on the light-sensitive pixels 604 underlying the respective stray-light microlens 712 (e.g., a processor may determine an amount of stray light incident on the light-sensitive pixels 604 underlying each of the stray-light microlenses 712 based on the determined angle of incidence of the light on the underlying light-sensitive pixels 604). In some embodiments, for example, a controller may determine an angle of incidence for each light signal detected by each subset of light-sensitive pixels 604 underlying each stray-light microlens 712. Then, based on the determined angles of incidence, the controller may determine an amount of stray light incident on the image sensor 704.

The amount of stray light incident on the image sensor 704 may include an amount incident on the respective regions of the image sensor 704 where the stray-light microlenses 712 are located, an aggregate quantity representing an amount of stray light incident across the entire image sensor 704 (e.g., based on extrapolation of the amount of stray light incident on the respective regions of the image sensor 704 where the stray-light microlenses 712 are located), and/or a map (e.g., a plot) of stray light across the image sensor 704 (e.g., based on interpolation of the amount of stray light incident on the respective regions of the image sensor 704 where the stray-light microlenses 712 are located).

In some embodiments, the controller may also determine a true-black optical level (and/or a true-black electrical level) based on the determined amount of stray light incident on the image sensor 704. For example, the controller may perform a regression analysis (e.g., of determined stray light vs. detected object signal) or statistical analysis of the stray light incident on each subset of light-sensitive pixels 604 that is beneath a stray-light microlens 712. Then, based on this analysis, the controller may determine a y-intercept (e.g., an intercept along a stray-light intensity axis when detected object signal is equal to 0) to identify a true-black optical level. The true-black optical level may be used in one or more processes performed by the controller (e.g., an auto-exposure process).

In some embodiments, some of the stray-light microlenses 712 may correspond to specific color channels (e.g., color channels in images captured using the image sensor 704). For example, if the light-sensitive pixels 604 are sensitive to one of: red light, blue light, or green light (e.g., based on an optical filter in the light-sensitive pixel 604), some of the subsets of light-sensitive pixels 604 may also be sensitive to the same color (e.g., each subset of light-sensitive pixels 604 may only be sensitive to red, each may only be sensitive to blue, or each may only be sensitive to green). For instance, one stray-light microlens 712 may be positioned over nine light-sensitive pixels 604 that are each sensitive to only green light signals while a neighboring stray-light microlens 712 may be positioned over nine light-sensitive pixels 604 that are each sensitive to only red light signals. This may be contrary to the arrangement of colored light-sensitive pixels 604 across a bulk of the image sensor 704 (e.g., nine neighboring light-sensitive pixels may all be sensitive to the same wavelength range, rather than sensitive to different wavelength ranges). For example, the light-sensitive pixels 604 in the bulk of the image sensor 704 (e.g., the light-sensitive pixels 604 over which stray-light microlenses 712 are not disposed) may be organized in a Bayer filter (i.e., BGRG) arrangement, whereas the light-sensitive pixels 604 underneath each of the stray-light microlenses 712 may not be organized in a Bayer filter arrangement.

In embodiments where one or more subsets of light-sensitive pixels 604 underneath corresponding stray-light microlenses 712 may correspond to specific color channels, a processor (e.g., a camera controller) may determine stray light of the corresponding color based on the angles of incidence of light incident on the respective light-sensitive pixels 604 underneath the stray-light microlenses 712. For example, if a subset of light-sensitive pixels 604 underneath a stray-light microlens 712 corresponds to a blue channel, a processor (e.g., a camera controller) may determine an amount of stray blue light incident on the underlying light-sensitive pixels 604 based on a determined angle of incidence for the blue light-sensitive pixels 604 underneath the stray-light microlens 712. Such stray light determinations for different color channels may be done using different subsets of light-sensitive pixels 604 having different color sensitivities. For example, a first subset of light-sensitive pixels 604 may correspond to a first color channel of the image sensor 704 (e.g., a red color channel), a second subset of light-sensitive pixels 604 may correspond to a second color channel of the image sensor 704 (e.g., a green color channel), and a third subset of light-sensitive pixels 604 may correspond to a third color channel of the image sensor 704 (e.g., a blue color channel). Using the light signals detected by the first subset of light-sensitive pixels 604, the second subset of light-sensitive pixels 604, and the third subset of light-sensitive pixels 604, an amount of stray light for a first color channel (e.g., red), a second color channel (e.g., blue), and a third color channel (e.g., green) can be determined. Because the stray-light determinations can be done in a color channel-specific fashion, the stray-light determinations for different color channels can also assist in demosaicing an image captured by the image sensor 704.

Using the stray-light determinations corresponding to multiple subsets of light-sensitive pixels 604 under corresponding stray-light microlenses 712, a processor (e.g., a camera controller) may make inferences (e.g., via regression, interpolation, or other techniques) about the stray light incident on other regions of the image sensor 704 (e.g., regions where there are not stray-light microlenses 712). Based on these inferences a plot and/or map of the estimated stray light across the image sensor 704 may be generated. Such generated plots and/or maps may be stored (e.g., within a memory of the camera) and used in run-time to identify stray light within and/or extract stray light from captured images (e.g., in post-processing a controller may alter the intensity in certain regions of a captured image based on the stored plot and/or map).

Figure 8A:
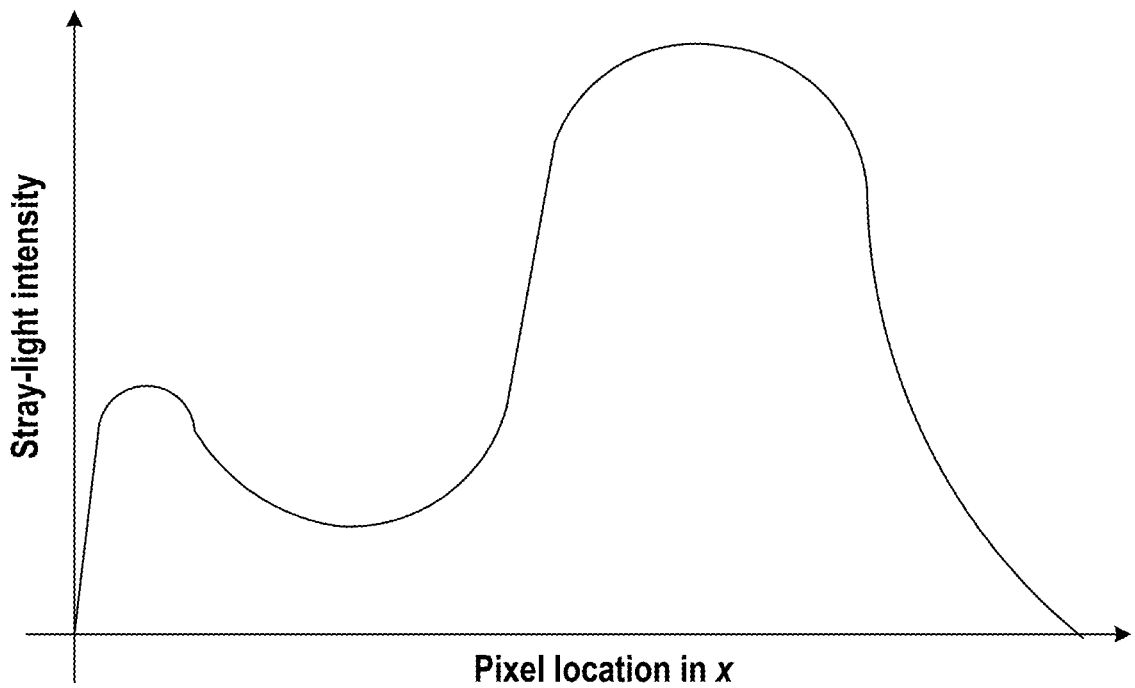
FIG. 8A is an illustration of a generated stray-light map, according to example embodiments.

FIG. 8A illustrates an example generated stray-light map. As illustrated in FIG. 8A, the stray-light map may be a plot of stray-light intensity with respect to pixel location along an x-axis of the image sensor 704. The plot may be generated based on determined stray-light intensities from one or more subsets of light-sensitive pixels 604 underlying one or more corresponding stray-light microlenses 712, for example. Additionally or alternatively, in some embodiments, a plot of stray-light intensity with respect to pixel location along a y-axis may be generated. The plot illustrated in FIG. 8A may be generated based on a determined angle of incidence for a light signal incident on a first subset of light-sensitive pixels 604 on the image sensor 704, a determined angle of incidence for a light signal incident on a second subset of light-sensitive pixels 604 on the image sensor 704, the location of the first subset of light-sensitive pixels 604 on the image sensor 704, and the location of the second subset of light-sensitive pixels 604 on the image sensor 704. Further, in some embodiments, determining the stray-light map (e.g., by a camera controller) may include generating a gamma-encoded histogram or a log-encoded histogram and interpolating values for light-sensitive pixel 604 locations that are not within the subsets of light-sensitive pixels 604 for which an amount of stray light was determined.

Figure 8B:
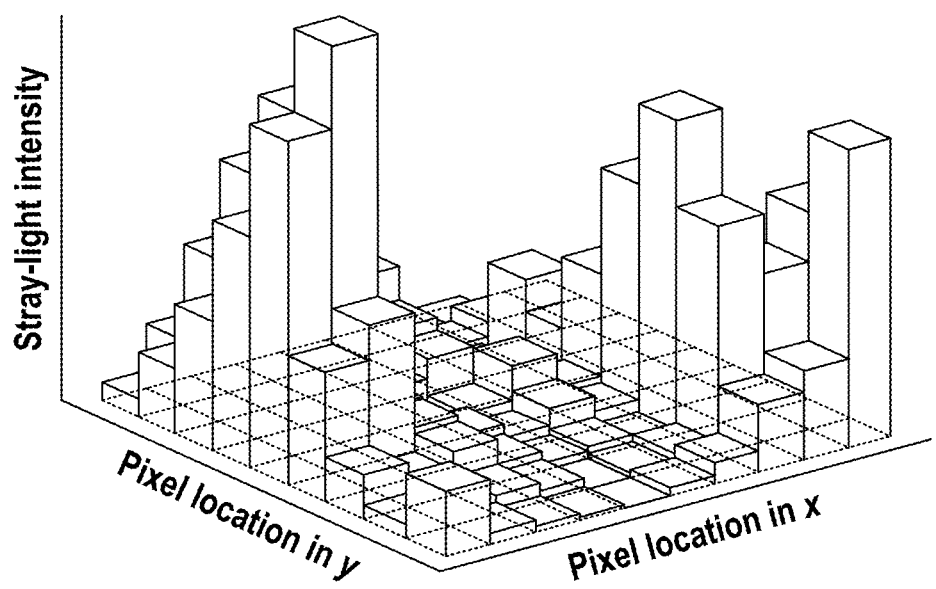
FIG. 8B is an illustration of a generated stray-light map, according to example embodiments.
Figure 9A:
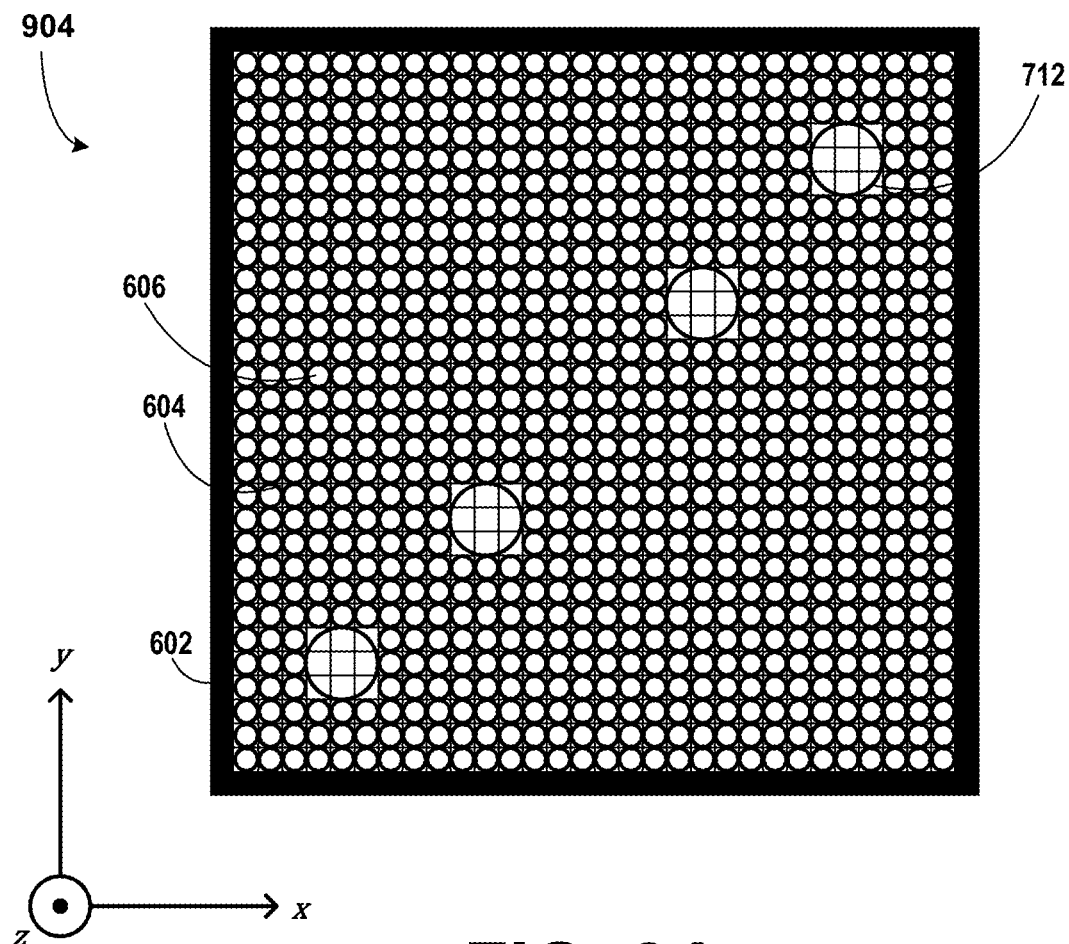
FIG. 9A is an illustration of an image sensor, according to example embodiments.
Figure 9B:
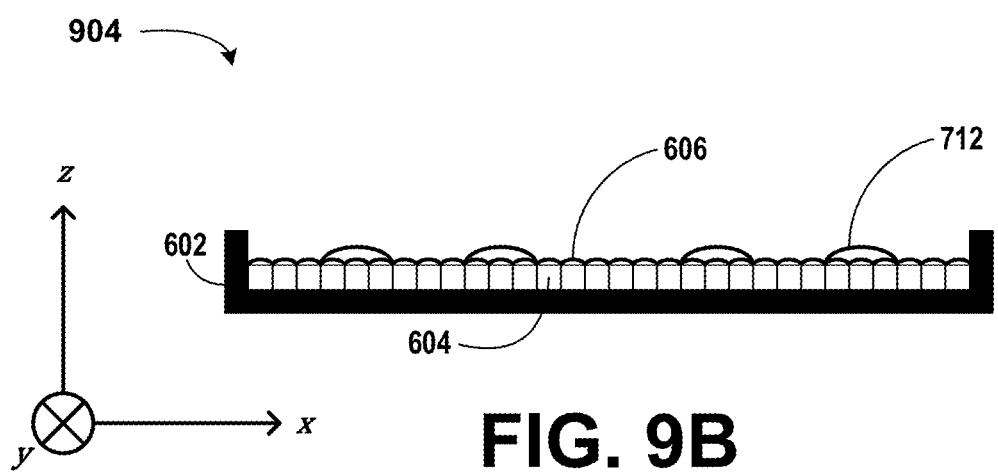
FIG. 9B is an illustration of an image sensor, according to example embodiments.
Figure 10A:
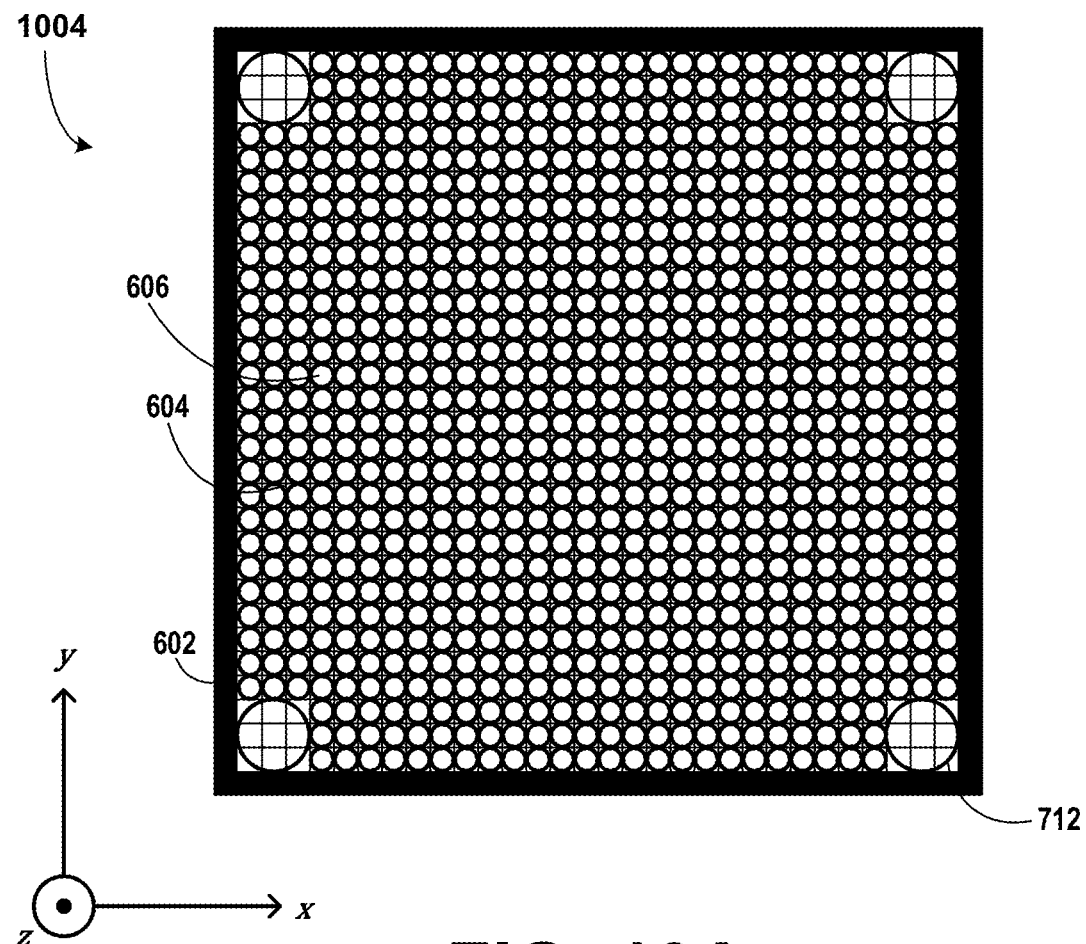
FIG. 10A is an illustration of an image sensor, according to example embodiments.
Figure 10B:
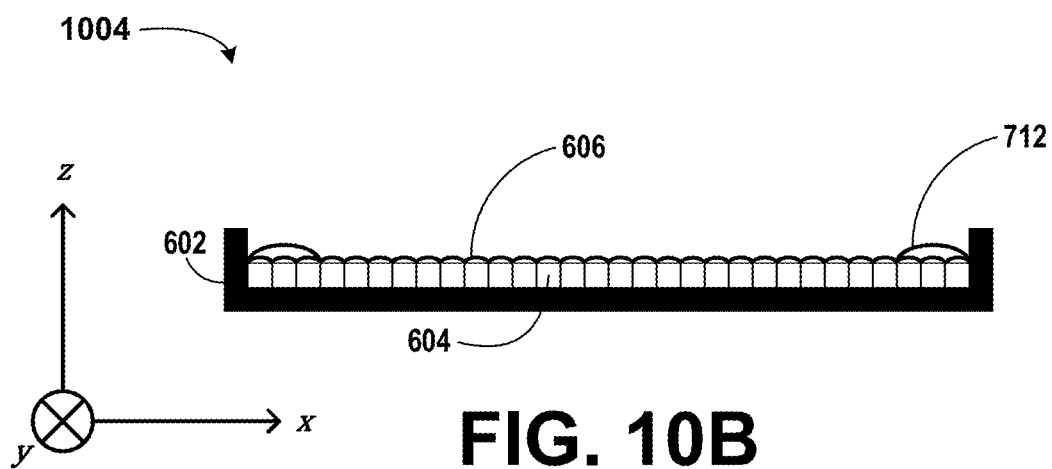
FIG. 10B is an illustration of an image sensor, according to example embodiments.

FIG. 8B represents a two-dimensional stray-light map (e.g., a two-dimensional histogram). As illustrated, a vertical axis of the map corresponds to stray-light intensity, and the two horizontal axes correspond to the horizontal axes of the image sensor 704 (e.g., pixel location along the y-axis and pixel location along the x-axis). Like the plot illustrated in FIG. 8A, the two-dimensional stray-light map illustrated in FIG. 8B may be generated based on determined stray-light intensities from one or more subsets of light-sensitive pixels 604 underlying one or more corresponding stray-light microlenses 712. Also like the plot illustrated in FIG. 8A, the two-dimensional stray-light map illustrated in FIG. 8B may be generated based on a determined angle of incidence for a light signal incident on a first subset of light-sensitive pixels 604 on the image sensor 704, a determined angle of incidence for a light signal incident on a second subset of light-sensitive pixels 604 on the image sensor 704, the location of the first subset of light-sensitive pixels 604 on the image sensor 704, and the location of the second subset of light-sensitive pixels 604 on the image sensor 704. Further, in some embodiments, determining the stray-light map (e.g., by a camera controller) may include generating a gamma-encoded histogram or a log-encoded histogram and interpolating values for light-sensitive pixel 604 locations that are not within the subsets of light-sensitive pixels 604 for which an amount of stray light was determined.

As described above, the stray-light maps illustrated in FIGS. 8A and 8B may be stored (e.g., within a memory of the camera) and used in run-time to identify stray light within and/or extract stray light from captured images (e.g., in post-processing a controller may alter the intensity in certain regions of a captured image based on the stored plot and/or map). For example, a controller may be configured to alter payload images captured using the image sensor 704 by selectively decreasing an intensity of one or more regions of the payload images based on the determined amount of stray light (e.g., based on the generated stray-light map(s)). Additionally or alternatively, a controller (e.g., a controller associated with a camera, such as the camera 400 illustrated in FIG. 4A or the camera 130 illustrated in FIG. 1) may be configured to adjust a pose of a camera, adjust a lens of a camera, and/or apply one or more filters (e.g., neutral-density filters) to a camera or a portion of the camera based on a determined amount of stray light on the image sensor (e.g., based on one or both of the stray-light maps illustrated in FIGS. 8A and 8B).

The determined amount of stray light (e.g, the determined amount of stray-light across the image sensor 704 described by one or more stray-light maps) may be stored in a memory (e.g., a non-transitory, computer-readable medium associated with a camera controller) as a look-up table (e.g., a look-up table that can be accessed by the controller in run-time).

In some embodiments, the stray-light maps illustrated in FIGS. 8A and 8B may correspond to a single color channel of the corresponding image sensor 704 (e.g., based on signals detected by light-sensitive pixels 604 beneath stray-light microlenses 712 that are of the respective color channel, such as nine red-light-sensitive pixels beneath a stray-light microlens 712). In such embodiments, there may be multiple generated stray-light maps (e.g., one stray-light map for each color channel of the image sensor 704). For example, a controller may generate a first stray-light map across the image sensor 704 corresponding to a first color channel, generate a second stray-light map across the image sensor 704 corresponding to a second color channel, and generate a third stray-light map across the image sensor 704 corresponding to a third color channel.

FIGS. 8A and 8B are provided by way of example only. It is understood that other stray-light maps are also possible and contemplated herein (e.g., stray-light maps with different dimensionality, different units, different resolutions, etc.). In some embodiments, no stray-light map may be determined. For example, the raw data associated with signals detected from light-sensitive pixels 604 beneath stray-light microlenses 712 may be stored (e.g., in a memory, such as a non-transitory, computer-readable medium). Then, when stray-light for a given region of the image sensor 704 is to be determined at a later time, a calculation for that specific region is made based on the stored raw data.

While a plurality of stray-light microlenses 712 are illustrated in FIGS. 7A and 7B and used to produce the stray-light maps illustrated in FIGS. 8A and 8B, FIGS. 7A and 7B are provided by way of example. It is understood that in alternate embodiments, other numbers of stray-light microlenses 712 could be included in the image sensor 704 (e.g., a greater number of stray-light microlenses 712 could be included, a lesser number of stray-light microlenses 712 could be included, or even only a single stray-light microlens 712 could be included). For example, in various embodiments, one, two, three, four, five, six, seven, eight, nine, ten, etc. stray-light microlenses 712 may be included in the image sensor 704. Additionally or alternatively, while the stray-light microlenses 712 illustrated in FIG. 7A are positioned around the entire periphery of the image sensor 704, in alternate embodiments, the stray-light microlenses 712 may be positioned in additional or alternative locations on the image sensor. For example, as illustrated in the image sensor 904 of FIGS. 9A and 9B, one or more of the stray-light microlenses 712 may be positioned in the bulk region of the image sensor 904 (e.g., the region of the image sensor 904 used to capture light from the surrounding scene). Alternatively, in some embodiments, as illustrated in the image sensor 1004 of FIGS. 10A and 10B, the stray-light microlenses 712 may only be positioned in the corners of the image sensor 1004. Other embodiments are also possible and are contemplated herein.

III. Example Processes

Figure 11:
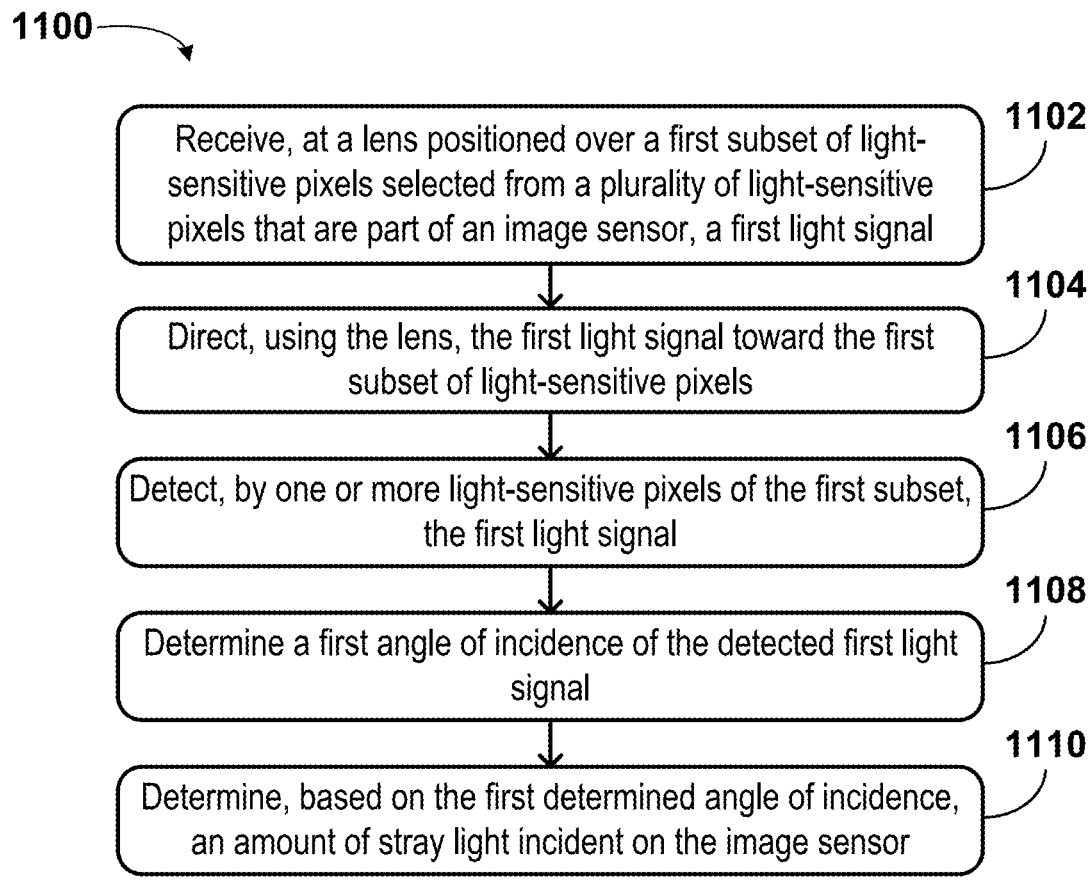
FIG. 11 is an illustration of a method, according to example embodiments.

FIG. 11 is a flowchart diagram of a method 1100, according to example embodiments.

At block 1102, the method 1100 may include receiving, at a lens positioned over a first subset of light-sensitive pixels selected from a plurality of light-sensitive pixels that are part of an image sensor, a first light signal.

At block 1104, the method 1100 may include directing, using the lens, the first light signal toward the first subset of light-sensitive pixels.

At block 1106, the method 1100 may include detecting, by one or more light-sensitive pixels of the first subset, the first light signal.

At block 1108, the method 1100 may include determining a first angle of incidence of the detected first light signal.

At block 1110, the method 1100 may include determining, based on the first determined angle of incidence, an amount of stray light incident on the image sensor.

IV. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A device comprising:
   an image sensor comprising a plurality of light-sensitive pixels;
   a first lens positioned over a first subset of light-sensitive pixels selected from the plurality of light-sensitive pixels; and
   a controller configured to:
   determine a first angle of incidence of a first light signal detected by the first subset of light-sensitive pixels;
   based on the first determined angle of incidence, determine an amount of stray light incident on the image sensor; and
   alter payload images captured using the image sensor based on the determined amount of stray light.

2. The device of claim 1, wherein determining the amount of stray light incident on the image sensor comprises comparing the first determined angle of incidence to a threshold angle of incidence.

3. The device of claim 2, wherein the threshold angle of incidence is 10°, and wherein the first determined angle of incidence and the threshold angle of incidence are measured relative to a vector that extends perpendicularly from a surface of the image sensor.

4. The device of claim 1, further comprising a second lens positioned over a second subset of light-sensitive pixels selected from the plurality of light-sensitive pixels, wherein the controller is further configured to:
   determine a second angle of incidence of a second light signal detected by the second subset of light-sensitive pixels; and
   based on the second determined angle of incidence, determine the amount of stray light incident on the image sensor.

5. The device of claim 4, wherein the controller is further configured to generate a stray-light map across the image sensor based on the first determined angle of incidence, the second determined angle of incidence, a location of the first subset of light-sensitive pixels on the image sensor, and a location of the second subset of light-sensitive pixels on the image sensor.

6. The device of claim 5, wherein determining the stray-light map comprises generating a gamma-encoded histogram or a log-encoded histogram and interpolating values for light-sensitive pixel locations that are not within the first subset of light-sensitive pixels or the second subset of light-sensitive pixels.

7. The device of claim 4, further comprising a third lens positioned over a third subset of light-sensitive pixels selected from the plurality of light-sensitive pixels, wherein the controller is also configured to:
   determine a third angle of incidence of a third light signal detected by the third subset of light-sensitive pixels; and
   based on the third determined angle of incidence, determine the amount of stray light incident on the image sensor.

8. The device of claim 7, wherein the first subset of light-sensitive pixels corresponds to a first color channel of the image sensor, wherein the second subset of light-sensitive pixels corresponds to a second color channel of the image sensor, and wherein the third subset of light-sensitive pixels corresponds to a third color channel of the image sensor.

9. The device of claim 8, wherein the controller is further configured to:
   generate a first stray-light map across the image sensor corresponding to the first color channel;
   generate a second stray-light map across the image sensor corresponding to the second color channel; and
   generate a third stray-light map across the image sensor corresponding to the third color channel.

10. The device of claim 1, wherein the first subset of light-sensitive pixels is oriented along a periphery of the image sensor.

11. The device of claim 10, wherein the first subset of light-sensitive pixels is located in a corner of the image sensor.

12. The device of claim 1, wherein the first angle of incidence is determined by comparing relative intensities detected by each light-sensitive pixel in the first subset of light-sensitive pixels.

13. The device of claim 1, wherein determining the amount of stray light incident on the image sensor comprises comparing the first determined angle of incidence to a threshold angle of incidence, and wherein the threshold angle of incidence is based on:
    a geometry of the image sensor;
    materials of the image sensor;
    a geometry of the first lens;
    materials of the first lens;
    environmental factors; or
    a user setting.

14. The device of claim 1, wherein the determined amount of stray light is stored in a memory as a look-up table.

15. The device of claim 1, wherein the first subset of light-sensitive pixels comprises a 2×2 array of light-sensitive pixels, a 3×3 array of light-sensitive pixels, or a 4×4 array of light-sensitive pixels.

16. The device of claim 1, wherein the controller is further configured to determine a true-black optical level based on the determined amount of stray light.

17. The device of claim 1, wherein the image sensor is associated with a camera, and wherein the controller is further configured to adjust a pose of the camera, adjust a lens of the camera, or apply one or more filters to the camera based on the determined amount of stray light.

18. The device of claim 1, wherein the device is used for object detection and avoidance within an autonomous vehicle.

19. A method comprising:
    receiving, at a lens positioned over a first subset of light-sensitive pixels selected from a plurality of light-sensitive pixels that are part of an image sensor, a first light signal;
    directing, using the lens, the first light signal toward the first subset of light-sensitive pixels;
    detecting, by one or more light-sensitive pixels of the first subset, the first light signal;
    determining a first angle of incidence of the detected first light signal;
    determining, based on the first determined angle of incidence, an amount of stray light incident on the image sensor; and
    altering payload images captured using the image sensor based on the determined amount of stray light.

20. A device comprising:
an image sensor comprising a plurality of light-sensitive pixels;
a plurality of subsets of light-sensitive pixels selected from the plurality of light-sensitive pixels positioned along an entire periphery of the image sensor;
a plurality of lenses, wherein each lens is positioned over a corresponding subset of light-sensitive pixels; and
a controller configured to:
  determine an angle of incidence of light detected by each subset of light-sensitive pixels; and
  based on the determined angles of incidence, determine a stray-light map across the image sensor; and
  alter payload images captured using the image sensor based on the determined stray-light map.

* * * * *